(12) United States Patent
Sirotkin

(10) Patent No.: US 11,368,362 B2
(45) Date of Patent: Jun. 21, 2022

(54) TRANSPORT NETWORK LAYER ASSOCIATIONS ON THE F1 INTERFACE

(71) Applicant: Apple Inc., Cupertino, CA (US)

(72) Inventor: Alexander Sirotkin, Petach Tikva (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/182,019

(22) Filed: Nov. 6, 2018

(65) Prior Publication Data

US 2019/0075023 A1 Mar. 7, 2019

Related U.S. Application Data

(60) Provisional application No. 62/582,839, filed on Nov. 7, 2017.

(51) Int. Cl.
| | |
|---|---|
| *H04L 41/0813* | (2022.01) |
| *H04L 41/082* | (2022.01) |
| *H04W 88/08* | (2009.01) |
| *H04L 69/326* | (2022.01) |

(52) U.S. Cl.
CPC ........ *H04L 41/0813* (2013.01); *H04L 41/082* (2013.01); *H04W 88/08* (2013.01); *H04L 69/326* (2013.01)

(58) Field of Classification Search
CPC ... H04L 41/082; H04L 41/0813; H04L 69/03; H04W 88/08
See application file for complete search history.

(56) References Cited

U.S. PATENT DOCUMENTS

| | | | |
|---|---|---|---|
| 2011/0044284 A1 | 2/2011 | Voltolina et al. | |
| 2015/0373733 A1* | 12/2015 | Bangolae | H04L 65/608 370/329 |
| 2016/0057663 A1 | 2/2016 | Teyeb et al. | |
| 2016/0242038 A1 | 8/2016 | Lei | |
| 2016/0302122 A1 | 10/2016 | Masini et al. | |
| 2016/0323919 A1* | 11/2016 | Xu | H04W 48/08 |
| 2018/0279218 A1* | 9/2018 | Park | H04W 36/08 |

(Continued)

OTHER PUBLICATIONS

Ericsson, "F1 multiple SCTP associations," 3GPP TSG-RAN WG3 Meeting #97bis, R3-174118, Agenda item: 10.10.1.1, Oct. 9-13, 2017, Prague, Czech Republic, 2 pages.

(Continued)

*Primary Examiner* — Jianye Wu

(74) *Attorney, Agent, or Firm* — Sterne, Kessler, Goldstein & Fox P.L.L.C.

(57) ABSTRACT

Apparatuses, systems, methods, and computer-readable media associated with F1 interface arrangement configuration within a network that implements virtualized NodeBs are disclosed herein. In embodiments, one or more non-transitory computer-readable media having instructions stored thereon, wherein the instructions, in response to execution by one or more processors, cause a centralized unit (CU) of an access node to generate a CU configuration update message, the CU configuration update message to include an indication of a transport network layer (TNL) address of the CU for which a TNL association between the CU and a distributed unit (DU) of the access node is to be added or removed, and cause the CU configuration update message to be transmitted to the DU. Other embodiments may be described and/or claimed.

20 Claims, 14 Drawing Sheets

(56) References Cited

U.S. PATENT DOCUMENTS

| | | | |
|---|---|---|---|
| 2019/0053183 A1* | 2/2019 | Park | H04W 56/0005 |
| 2019/0053193 A1 | 2/2019 | Park et al. | |
| 2019/0208563 A1* | 7/2019 | Zee | H04W 76/38 |
| 2019/0357093 A1 | 11/2019 | Xu et al. | |
| 2019/0372841 A1 | 12/2019 | Sirotkin | |
| 2020/0029322 A1* | 1/2020 | Yu | H04W 48/06 |
| 2020/0169865 A1 | 5/2020 | Sirotkin et al. | |

OTHER PUBLICATIONS

Huawei, "Update of TS 38.473," 3GPP TSG RAN WG3 Meeting #97, R3-173451, 3GPP TS 38.473 V0.3.0 (Sep. 2017), Agenda item: 10.12.3.3, Aug. 21-25, 2017, Berlin, Germany, 21 pages.

* cited by examiner

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB ID (FFS) | M | | | | FFS | FFS |
| Cells to be Activated List | | 0..1 | | | | |
| >Cells to be Activated List Item | M | 1..<maxCellingNBCU> | | List of cells to be activated | YES | reject |
| >>NR Cell ID | M | | FFS | NR cell identifier (FFS) | - | - |
| >>gNB-CU System Information | M | | | RRC container with system information owned by gNB-CU | - | - |
| >>Broadcast PLMN (FFS) | | | | | FFS | FFS |
| >>TAI (FFS) | | | | | FFS | FFS |
| CU TNL to be Setup List | | 0..1 | | | YES | ignore |
| >CU TNL to be Setup Item IEs | M | 1..<maxnoofTNLAssociations> | | | YES | ignore |
| >>CU Transport Layer Address | | | | Transport Layer Address of the CU. | YES | ignore |

FIGURE 2

| | IE/Group Name | Presence | Range | IE type and reference | Semantics description | Criticality | Assigned Criticality |
|---|---|---|---|---|---|---|---|
| 402 | Message Type | M | | 9.3.1.1 | | YES | reject |
| 404 | Cells to be Activated List | | 0..1 | | List of cells to be activated or modified | YES | reject |
| 406 | >Cells to be Activated List Item | | 1..<maxCellingNBDU> | | | EACH | reject |
| 408 | >>NR Cell ID | M | | FFS | NR cell identifier (FFS) | - | - |
| 410 | >> gNB-CU System Information | M | | FFS | RRC container with system information owned by gNB-CU | | |
| 412 | >>Broadcast PLMN (FFS) | | | | | FFS | FFS |
| 414 | >>TAI (FFS) | | | | | FFS | FFS |
| 416 | Cells to be Deactivated List | | 0..1 | | List of cells to be deactivated | YES | reject |
| 418 | >Cells to be Deactivated List Item | | 1..<maxCellingNBDU> | | | EACH | reject |
| 420 | >>NR Cell ID | M | | FFS | NR cell identifier (FFS) | - | - |
| 422 | CU TNL to be Setup List | | 0..1 | | | YES | ignore |
| 424 | >CU TNL to be Setup Item IEs | | 1..<maxnoofTNLAssociations> | | | YES | ignore |
| 426 | >>CU Transport Layer Address | M | | | Transport Layer Address of the CU. | YES | ignore |
| 428 | CU TNL to be Removed List | | 0..1 | | | YES | ignore |
| 430 | >CU TNL to be Removed Item IEs | | 1..<maxnoofTNLAssociations> | | | YES | ignore |
| 432 | >>CU Transport Layer Address | M | | | Transport Layer Address of the CU. | YES | ignore |

FIGURE 4

TRANSPORT NETWORK LAYER ASSOCIATIONS ON THE F1 INTERFACE

RELATED APPLICATIONS

The present application claims priority to U.S. Provisional Patent Application No. 62/582,839, filed Nov. 7, 2017, entitled "MULTIPLE STREAM CONTROL TRANSMISSION PROTOCOL (SCTP) ASSOCIATIONS ON THE F1 INTERFACE," the entire disclosure of which is hereby incorporated by reference.

TECHNICAL FIELD

The present disclosure relates to the field of wireless networks. More particularly, the present disclosure relates to F1 interface arrangement configuration within a network that implements virtualized NodeBs.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

With the development of fifth generation (5G) wireless communications, virtualized NodeBs have been developed. In particular, each virtualized NodeBs includes a distributed unit (DU) that manages a first portion of the layers of the wireless communications and a centralized unit (CU) that manages a second portion of the layers of the wireless communications. While this separation of the virtualized NodeBs into DUs and CUs has provided advantages, additional communication needs to be managed to facilitate the arrangement.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 2 illustrates example information elements (IEs) that may be included in a response message, according to various embodiments.

FIG. 4 illustrates example IEs that may be included in a message, according to various embodiments.

DETAILED DESCRIPTION

Figure 1:
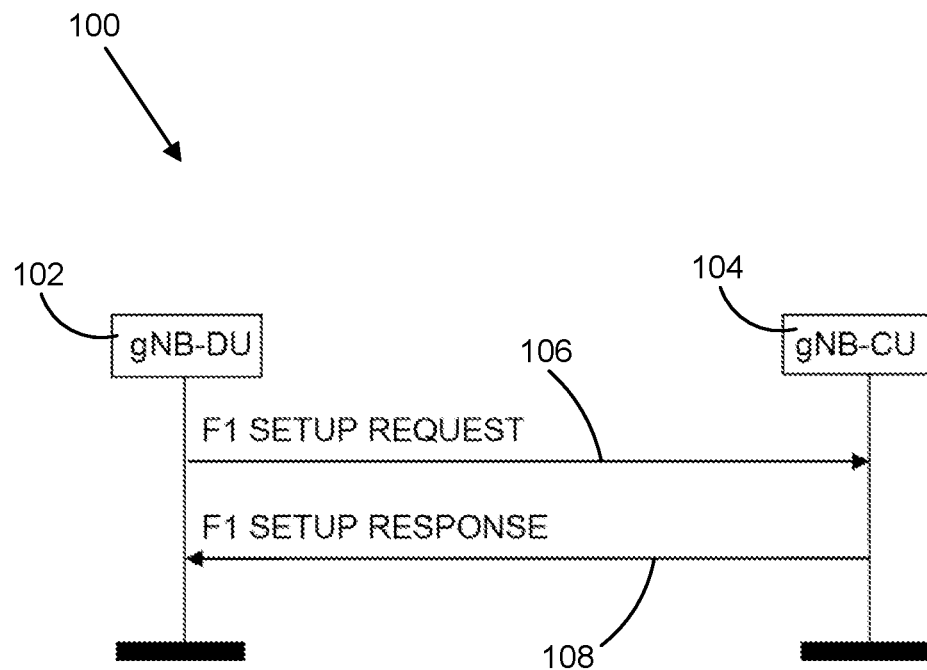
FIG. 1 illustrates an example F1 setup procedure, according to various embodiments.

Apparatuses, systems, methods, and computer-readable media associated with F1 interface arrangement configuration within a network that implements virtualized NodeBs are disclosed herein. In embodiments, one or more non-transitory computer-readable media having instructions stored thereon, wherein the instructions, in response to execution by one or more processors, cause a centralized unit (CU) of an access node to generate a CU configuration update message, the CU configuration update message to include an indication of a transport network layer (TNL) address of the CU for which a TNL association between the CU and a distributed unit (DU) of the access node is to be added or removed, and cause the CU configuration update message to be transmitted to the DU.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 7:
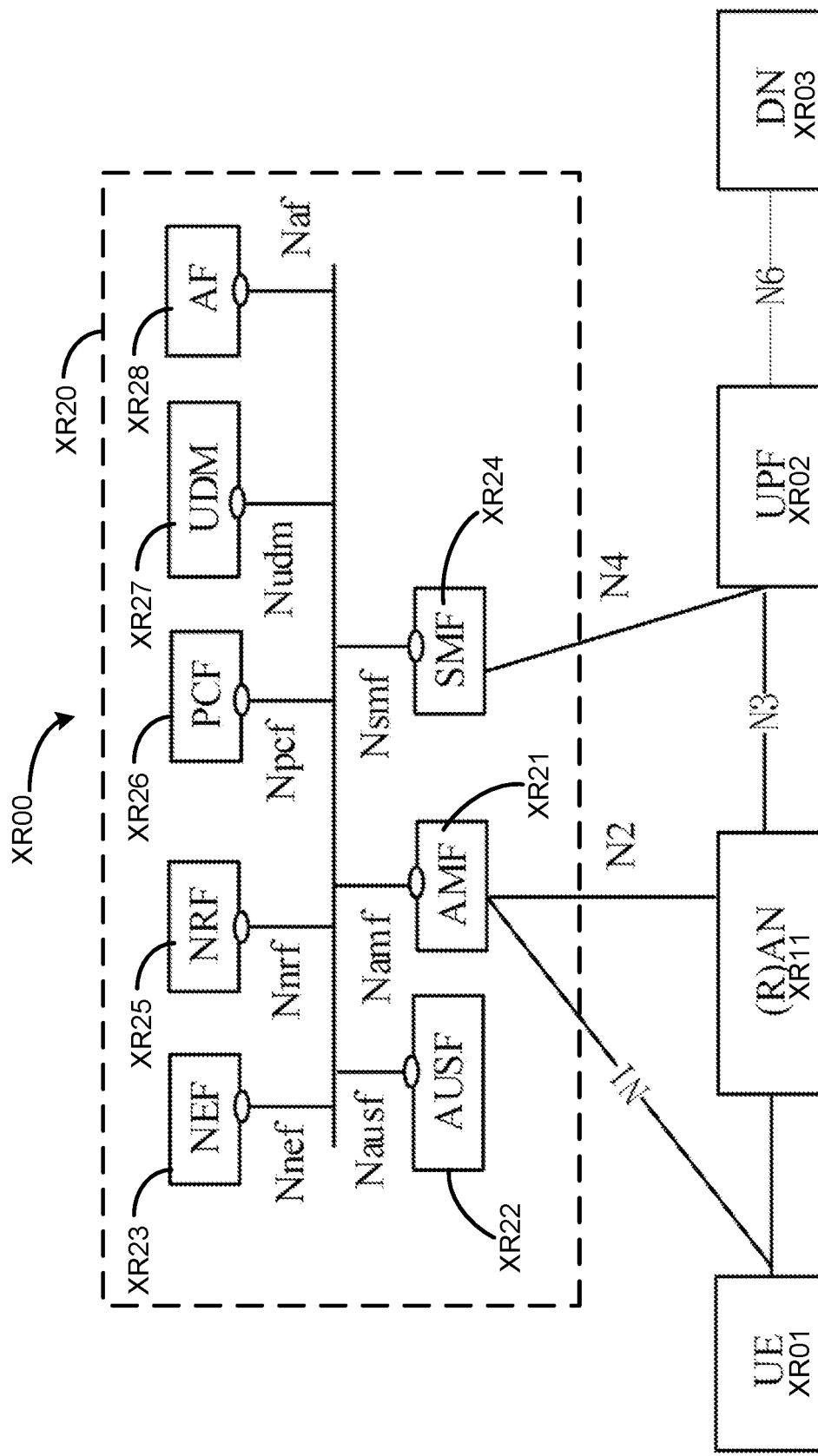
FIG. 7 illustrates an architecture of a system of a network in accordance with some embodiments.

In new radio (NR) implementations, an N2 interface may be between an Access and Mobility Management Function (AMF) and Radio Access Network (RAN), and may provide Non-Access Stratum (NAS) transport services/functionality (see, e.g., FIG. 7 infra). The N2 interface may map to an NG control plane (NG-C) interface, which may be a logical interface between an AMF and RAN node. The NG-C protocol stack may include a transport network layer that is built on Internet Protocol (IP) transport. For the reliable transport of signaling messages, a stream control transmission protocol (SCTP) layer is added on top of the IP layer. The application layer signaling protocol on top of the SCTP layer is referred to as NG Application Protocol (NG-AP).

Some NR systems may support multiple SCTP associations on the NG-C/N2 interface. This enables Fifth Generation (5G) Core Network deployments in virtualized environments by facilitating smooth relocation of AMF function to another virtualized resource.

The same approach can be applied to RAN, where a split architecture is currently being developed in which a next generation NodeB (gNB) and next generation evolved NodeB (ng-eNB) (which are also referred to as "access nodes" throughout this disclosure) are split into Centralized Unit (CU) and Distributed Unit (DU) (also referred to as gNB-CU/gNB-DU and ng-eNB-CU/ng-eNB-DU). The gNB may support 5G NR bands, such as 3.5 GHz band or 28 GHz band, while the ng-eNB may support LTE bands and also includes some 5G capabilities.

If CU is deployed in the virtualized environment, multiple SCTP associations support on the F1 interface can also be beneficial for the same reasons as for the NG-C/N2 interface—that is, in certain deployments instantiating new computational resources in CU may require adding new Transport Network Layer (TNL) addresses, and consequently bringing down certain computational resources may require releasing certain TNL addresses.

A single SCTP association may be employed for F1 application protocol (F1AP) elementary procedures that utilize F1AP signaling not related to a user equipment (UE), e.g., F1 Setup and Configuration Update, with the possibility of fail-over to a new association to enable robustness. Running other F1AP procedures over this same SCTP association is not precluded.

Various embodiments herein define standardized mechanisms to support multiple SCTP associations on the F1 interface. In embodiments, the NG-C/N2 principles may be followed, including: the assumption that one TNL address of the CU is pre-configured in the DU via operations, administration, and maintenance (OAM); that the DU establishes the first SCTP association using the pre-configured TNL address; and that the CU may indicate additional TNL addresses using either Setup or Configuration Update procedures.

The embodiments herein may be related to the stage-3 definition of F1 interface functionality and associated F1AP messages to support multiple SCTP associations between a DU and CU. The terms DU and CU, as used in the present disclosure, may refer to either gNB-DU and gNB-CU or ng-eNB-DU and ng-eNB-CU in NG-RAN (referring to "pure" 5G gNB and "evolved" eNB, respectively). In either case, the same F1 interface may be used.

F1 Interface

In various implementations, the F1 interface is a 5G radio network layer signaling protocol for signaling service between a DU of an access node and the a CU of the access node. The F1 Application Protocol (F1AP) supports the functions and signaling services of the F1 interface. F1AP services are divided into two groups: non-UE-associated services and UE-associated services. Non-UE-associated services are services related to the whole F1 interface instance between the DU of the access node and CU of the access node utilizing a non UE-associated signaling connection. UE-associated services are services related to one UE. F1AP functions that provide these services are associated with a UE-associated signaling connection that is maintained for the UE in question.

F1 Setup

FIG. 1 illustrates an example F1 setup procedure 100, according to various embodiments. The F1 setup procedure 100 may facilitate the setup of TNL associations on the F1 interface. In particular, the F1 setup procedure 100 can be implemented to set up configuration parameters between a distributed unit (DU) 102 of an access node and a centralized unit (CU) 104 of the access node. The F1 setup procedure 100 can exchange application level data for the DU 102 and the CU 104 to correctly interoperate on the F1 interface. The F1 Setup procedure may be the first F1AP procedure triggered after a TNL association has become operational. The F1 setup procedure may use non-UE associated signaling.

The F1 setup procedure 100 initiates with the DU 102 transmitting a message 106 to the CU 104. In particular, the message 106 may be an F1 setup request message. The message 106 may be transmitted in response to a transport network layer (TNL) association becoming operational.

In response to receiving the message 106, the CU 104 transmits a response message 108. In particular, the response message 108 may be an F1 setup response message. The response message 108 may be transmitted to transfer information for a TNL association. The response message 108 may include information regarding additional TNL addresses for which TNL associations may be established. The TNL associations may comprise SCTP associations in some embodiments.

FIG. 2 illustrates example information elements (IEs) that may be included in a response message, according to various embodiments. In particular, one or more of the IEs may be included in a response message, such as the response message 108 (FIG. 1).

The response message may include IEs used to identify the response message and the origin of the response message. In particular, the response message may include a message type element 202 that indicates the type of the message. Further, the response message may include a gNB identifier 204 that indicates a source of the message. The gNB identifier 204 may indicate a virtualized access node that includes a CU and a DU. In other instances, the response message includes a gNB identifier 204 that may indicate a non-virtualized gNB, a non-virtualized ng-eNB, a virtualized gNB, or a virtualized ng-eNB. The virtualized ng-eNB includes an ng-eNB-CU and an ng-eNB-DU.

The response message may further include IEs related to cells to be activated. In particular, the response message may include one or more of a cells to be activated list IE 206, a cells to be activated list item IE 208, an NR cell identifier IE 210, a gNB-CU system information IE 212, a broadcast public land mobile network (PLMN) IE 214, a tracking area identifier (TAI) IE 216, or some combination thereof. The cells to be activated list IE 206 indicates whether there are cells to be activated. The cells to be activated list item IE 208 indicates a list of cells that are to be activated. The NR cell identifier IE 210 indicates identifiers for the NR cells to be activated. The gNB-CU system information IE 212 may include a radio resource control (RRC) container with system information owned by the CU of a virtualized access node. The broadcast PLMN IE 214 indicates available PLMNs. The TAI IE 216 indicates supported single-network slice selection assistance information.

The response message may further include IEs related to TNL associations to be setup. In particular, the response message may include a CU TNL to be setup list IE 218, CU TNL to be setup item IEs 220, a CU transport layer address IE 222, or some combination thereof. The CU TNL to be setup list IE 218 indicates that one or more TNL associations between the CU and the DU should be established by the DU. In particular, the CU TNL to be setup list IE 218 may contain a first value that indicates that there are one or more TNL associations to the be established or a second value that indicates that there are no TNL associations to be established.

The CU TNL to be setup item IEs 220 indicates one or more TNL associations between the CU and the DU that should be established by the DU. For example, the CU TNL to be setup items IEs 220 may include a list of TNL associations to be established.

The CU transport layer address IE 222 indicates one or more TNL addresses of the CU. The DU may utilize the TNL addresses for establishing one or more TNL associations between the CU and the DU. For example, the DU may establish, or attempt to establish, the TNL associations indicated by the CU TNL to be setup item IEs 220 via the one or more TNL addresses indicated by the CU transport layer address IE 222. In some embodiments, the TNL associations may be SCTP associations.

The DU may establish one or more TNL associations between the CU and the DU in response to receiving the CU TNL to be setup list IE 218, the CU TNL to be setup item IEs 220, and the CU transport layer address IE 222 in the response message. The TNL associations may be SCTP associations.

Once multiple SCTP associations have been established between the CU and the DU, load balancing may be implemented. The load balancing may be utilized mainly for UE-associated signaling, where only one connection may be used for non-UE-associated signaling.

In some embodiments, the load balancing may be implemented by the DU randomly selecting an SCTP association for every UE in communication with the DU. Once the SCTP association is selected for every UE, both the DU and the CU continue using the selected SCTP association for the UE.

In some embodiments, the load balancing may be implemented by the CU randomly selecting an SCTP association for every UE. Once the SCTP association is selected for every UE, both the DU and the CU continue using the selected SCTP association for the UE.

In some embodiments, the load balancing may be implemented by one SCTP association being designated for load balancing. The DU sends a first uplink (UL) message via the one SCTP association. The CU may reply via another SCTP association, where the other SCTP association is then used for that UE by both the DU and the CU.

In some embodiments, the load balancing may be implemented by applying weight factors in the SCTP association selection procedure. The CU may signal the weight factors to be utilized in the SCTP association selection procedure. The SCTP association with higher weights may have a higher weight for being selected for association with the UE.

F1 Configuration Update

Figure 3:
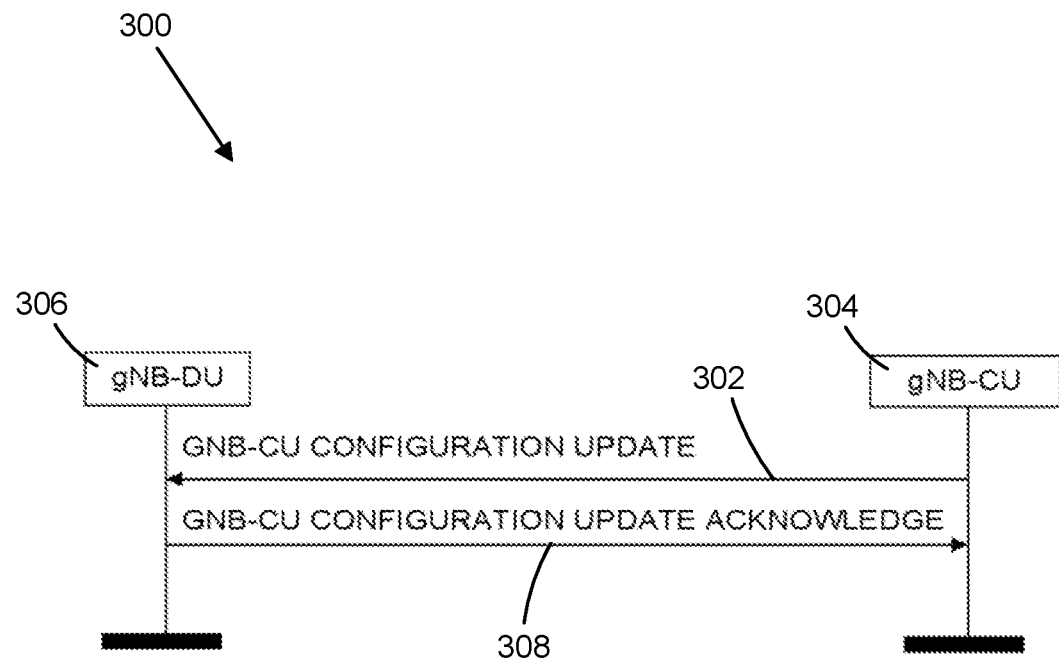
FIG. 3 illustrates an example CU configuration update procedure, according to various embodiments.

FIG. 3 illustrates an example CU configuration update procedure 300, according to various embodiments. In some embodiments, the CU configuration update procedure 300 may comprise a gNB-CU configuration update procedure. The CU configuration update procedure 300 may facilitate the update of TNL associations on the F1 interface. When a CU is deployed in a virtualized environment, the CU may have the capability of having computational resources being added or removed in a dynamic fashion. In particular, the computational resources may include computer hardware (such as network resources, storage resources, and/or compute resources), computer software, or some combination thereof. The CU may have the capability to add and/or remove TNL associations (which may comprise SCTP associations) to accommodate newly instantiated computational resources or shut down of computational resources of the CU. The CU configuration update procedure 300 may be initiated to facilitate the addition or removal of the TNL associations.

The CU configuration update procedure 300 may include transmission of a message 302 from a CU 304 of an access node to a DU 306 of the access node. The message 302 may be a CU configuration update message or a gNB-CU configuration update message. The message 302 may be sent by the CU 304 to transfer updated information for a TNL association between the CU 304 and the DU 306. The message 302 may include information regarding TNL associations that may be added and/or TNL associations that may be removed. The TNL associations may comprise SCTP associations in some embodiments. In some embodiments, the CU 304 may transmit the message 302 in response to a newly instantiated computational resource of the CU 304 or a shutdown of a computational resource of the CU 304.

In response to receiving the message 302, the DU 306 transmits a response message 308 to the CU 304. For example, the DU 306 may attempt to establish or remove one or more TNL associations in response to receiving the message 302 from the CU 304. The response message 308 may indicate a result of the attempt to establish or remove the TNL associations. Further, the response message 308 may indicate whether the DU 306 can accept the update. If the DU 306 can accept the update, the response message 308 may be a CU configuration update acknowledge message or a gNB-CU configuration update acknowledge message, as shown. If the DU 306 cannot accept the update, the response message 308 may be a CU configuration update failure message or a gNB-CU configuration update failure message.

FIG. 4 illustrates example IEs that may be included in a message, according to various embodiments. In particular, one or more of the IEs may be included in a message, such as the message 302 (FIG. 3). The message that includes the IEs may be a CU configuration update message or a gNB-CU configuration update message.

The message may include a message type IE 402. The message type IE 402 may identify the message. In particular, the message type IE 402 may uniquely identify the message.

The message may further include IEs related to cells to be activated by a DU of an access node. For example, the message may include a cells to be activated list IE 404, a cells to be activated list item IE 406, an NR cell identifier IE 408, a gNB-CU system information IE 410, a broadcast PLMN IE 412, a TAI IE 414, or some combination thereof. The cells to be activated list IE 404 indicates whether there are cells to be activated or modified. The cells to be activated list item IE 406 indicates a list of cells to be activated. The NR cell identifier IE 408 indicates NR cell identifiers for the cells to be activated. The gNB-CU system information IE 410 includes an RRC container with system information owned by the gNB-CU. The broadcast PLMN IE 412 indicates available PLMNs. The TAI IE 414 indicates supported single-network slice selection assistance information.

The message may further include IEs related to cells to be deactivated by the gNB-DU. For example, the message may include a cells to be deactivated list IE 416, a cells to be deactivated list item IE 418, an NR cell identifier IE 420, or some combination thereof. The cells to be deactivated list IE 416 indicates whether there are cells to be deactivated. The cells to be deactivated list item IE 418 indicates a list of cells to be deactivated. The NR cell identifier IE 420 indicates NR cell identifiers for the cells to be deactivated.

The message may further include IEs related to TNL associations to be added. In some embodiments, the TNL associations may comprise SCTP associations. The TNL associations to be added may be related to newly instantiated computational resources of the CU, where the TNL associations may be established via one or more TNL addresses of CU that may be associated with the newly instantiated computational resources. In other instances, the TNL associations may be related to computation resources being reassigned among DUs that are communicatively coupled to the CU.

The IEs related to TNL associations to be added may include a CU TNL to be setup list IE 422 (which may also be referred to as a gNB-CU TNL association to add list IE), a CU TNL to be setup item IEs 424 (which may also be referred to as a gNB-CU TNL association to add item IEs), a CU transport layer address IE 426 (which may also be referred to as a TNL association transport layer information IE), or some combination thereof. The IEs related to the TNL associations to be added may provide information for a DU to establish TNL associations between the CU and the DU in addition to the TNL associations that have already been established.

The CU TNL to be setup list IE 422 indicates whether TNL associations between the CU and the DU are to be established by the DU. For example, the CU TNL to be setup list IE 422 may contain a first value that indicates that there are TNL associations to be established or a second value that indicates that there are not TNL associations to be established. The TNL associations to be established may be in addition to TNL associations previously established between the CU and the DU.

The CU TNL to be setup item IEs 424 indicates one or more TNL associations between the CU and the DU that should be established by the DU. For example, the CU TNL to be setup item IEs 424 may include a list of TNL associations to be established.

The CU transport layer address IE 426 indicates one or more TNL addresses of the CU. The DU may utilize the TNL addresses for establishing one or more TNL associations between the CU and the DU. For example, the DU may establish, or attempt to establish, the TNL associations indicated by the CU TNL to be setup item IEs 424 via the one or more TNL addresses indicated by the CU transport layer address IE 426. In some embodiments, the TNL associations may be SCTP associations.

The message may further include IEs related to TNL associations to be removed. In some embodiments, the TNL associations may comprise SCTP associations. The TNL associations to be removed may be related to computational resources of the CU that were, or are being, shut down. In other instances, the TNL associations to be removed may be related to computation resources being reassigned to other DUs that are communicatively coupled to the CU.

The IEs related to TNL associations to be removed may include a CU TNL to be removed list IE 428 (which may also be referred to as a gNB-CU TNL association to remove list IE), a CU TNL to be removed item IEs 430 (which may also be referred to as a gNB-CU TNL association to remove item IEs), a CU transport layer address IE 432 (which may also be referred to as a TNL association transport layer address IE), or some combination thereof. The IEs related to the TNL associations to be removed may provide information for a DU to remove TNL associations between the CU and the DU that had been previously established.

The CU TNL to be removed list IE 428 indicates whether TNL associations between the CU and the DU are to be removed by the DU. For example, the CU TNL to be removed list IE 428 may contain a first value that indicates that there are TNL associations to be removed or a second value that indicates that there are not TNL associations to be removed.

The CU TNL to be removed item IEs 430 indicates one or more TNL associations between the CU and the DU that should be removed by the DU. For example, the CU TNL to be removed item IEs 430 may include a list of TNL associations to be removed.

The CU transport layer address IE 432 indicates one or more TNL addresses of the CU from which the TNL associations are to be removed. The DU may utilize the TNL addresses for removing one or more TNL associations between the CU and the DU. For example, the DU may remove, or attempt to remove, the TNL associations indicated by the CU TNL to be removed item IEs 430 from the one or more TNL addresses indicated by the CU transport layer address IE 432. In some embodiments, the TNL associations may be SCTP associations.

Further, in some embodiments, the message may include one or more IEs that utilize resources to be utilized for load balancing. For example, the IEs may include an IE that indicates a TNL association that is to be utilized for load balancing. The CU may then utilize the indicated TNL association for transmission of a first message from the CU to the DU.

Figure 5:
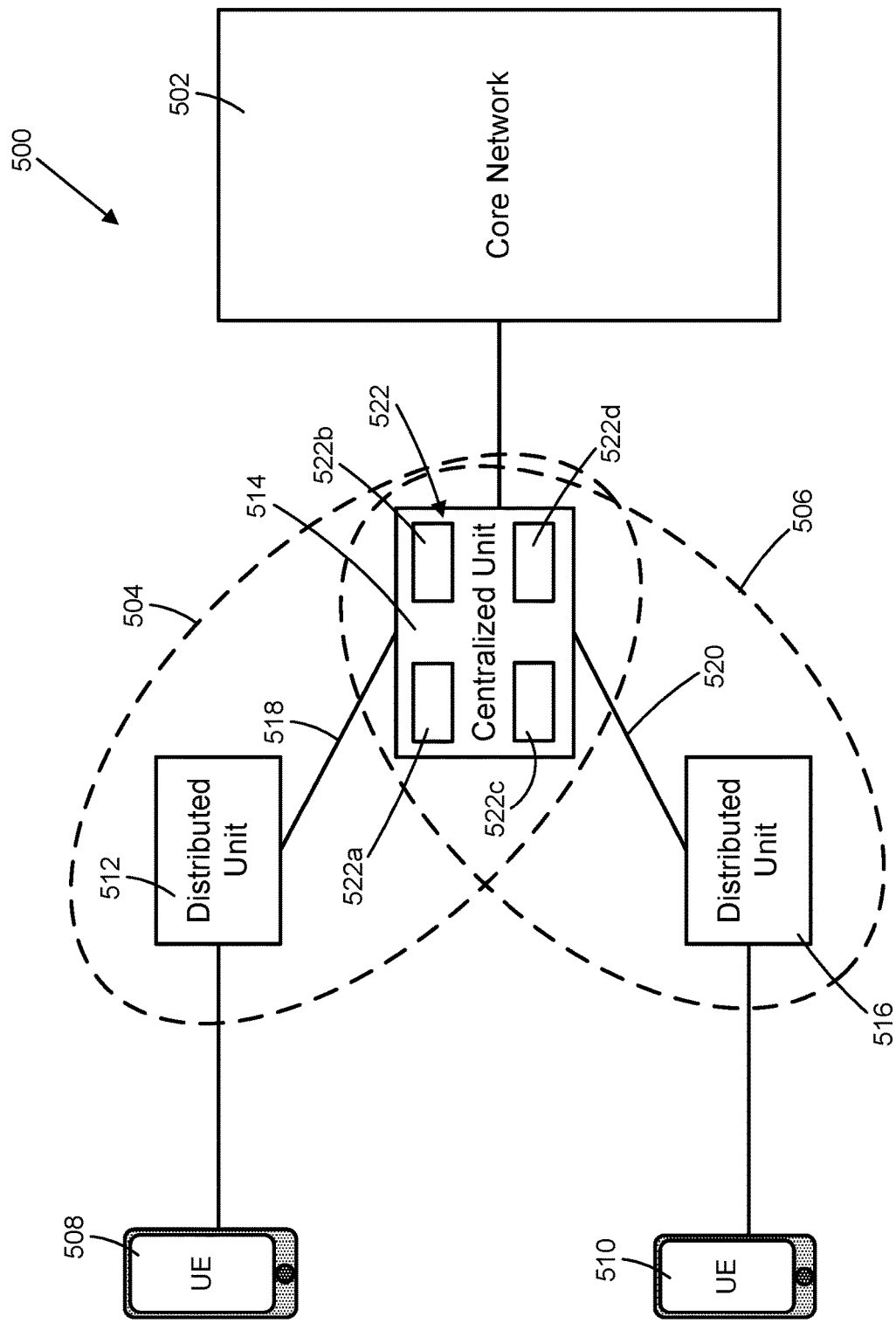
FIG. 5 illustrates an example portion of a network implementation that includes virtualized NodeBs, according to various embodiments.

FIG. 5 illustrates an example portion of a network implementation 500 that includes virtualized access nodes, according to various embodiments. For example, the virtualized access nodes may comprise virtualized gNBs, virtualized ng-eNB, or some combination thereof.

The network implementation 500 includes a core network (CN) 502. The CN 502 may comprise the CN XS20 (FIG. 6) or the CN XR20 (FIG. 7).

The network implementation 500 includes one or more virtualized access nodes. For example, the network implementation 500 includes a first virtualized access node 504 and a second virtualized access node 506. Each of the virtualized access nodes may provide service to one or more user equipments (UEs). For example, the network implementation 500 includes a first UE 508 that is provided service by the first virtualized access node 504 and a second UE 510 that is provided service by the second virtualized access node 506.

Each of the virtualized access nodes include a CU and a DU. In some embodiments, multiple DUs may share a single CU. In the illustrated embodiment, the first virtualized access node 504 includes a first DU 512 and a CU 514, and the second virtualized access node 506 includes a second DU 516 and the CU 514. The CU of each virtualized access node may manage the upper layers of the virtualized access node and the DU of each virtualized access node may manage the lower layers. For example, the CU 514 may manage the non access stratum (NAS) layer, the internet protocol (IP) layer, the RRC layer, and the packet data convergence control (PDCP) layer, while the first DU 512 may manage the radio link control (RLC) layer and the medium access control (MAC) layer in some embodiments. In other embodiments, the CU 514 may manage the NAS layer, the IP layer, and the RRC layer, while the first DU 512 may manage the PDCP layer, the RLC layer, and the MAC layer. Each of the CU and the DU may include computer hardware to implement management of the respective layers managed by the CU and the DU.

An F1 interface connection may be established between the DU and the CU in each of the virtualized access nodes. In particular, a first F1 interface 518 may be established between the first DU 512 and the CU 514, and a second F1 interface 520 may be established between the second DU 516 and the CU 514. Each of the F1 interfaces may support one or more TNL associations associated with the respective DU, where the TNL associations facilitate communication between the respective DU and the CU. For example, the first F1 interface 518 is associated with the first DU 512 and facilitates communication between the first DU 512 and the CU 514, and the second F1 interface 520 is associated with the second DU 516 and facilitates communication between the second DU 516 and the CU 514 in the illustrated embodiment.

The CU 514 may include one or more computational resources 522. In particular, the CU 514 includes a first computational resource 522a, a second computational resource 522b, a third computational resource 522c, and a fourth computational resource 522d. The computational resources 522 may include computer hardware (such as network resources, storage resource, and/or compute resources), computer software, or some combination thereof. Additional computational resources 522 may be dynamically added to the CU 514 and/or computational resources 522 may be dynamically shut down (and/or removed) from the CU 514.

To facilitate the addition and/or removal of the computational resources 522, the CU 514 may add and/or remove TNL associations (which may comprise SCTP associations) based on the addition and/or shut down of computational resources 522. For example, the F1 setup procedure 100 (FIG. 1) may be triggered in response to a TNL association becoming operational. As computational resources 522 are added and/or removed, the gNB-CU configuration update procedure 300 (FIG. 3) to add and/or remove TNL associations may be performed. The addition and/or removal of the computational resources 522 may further result in the addition and/or removal of corresponding TNL addresses of the CU 514.

Figure 6:
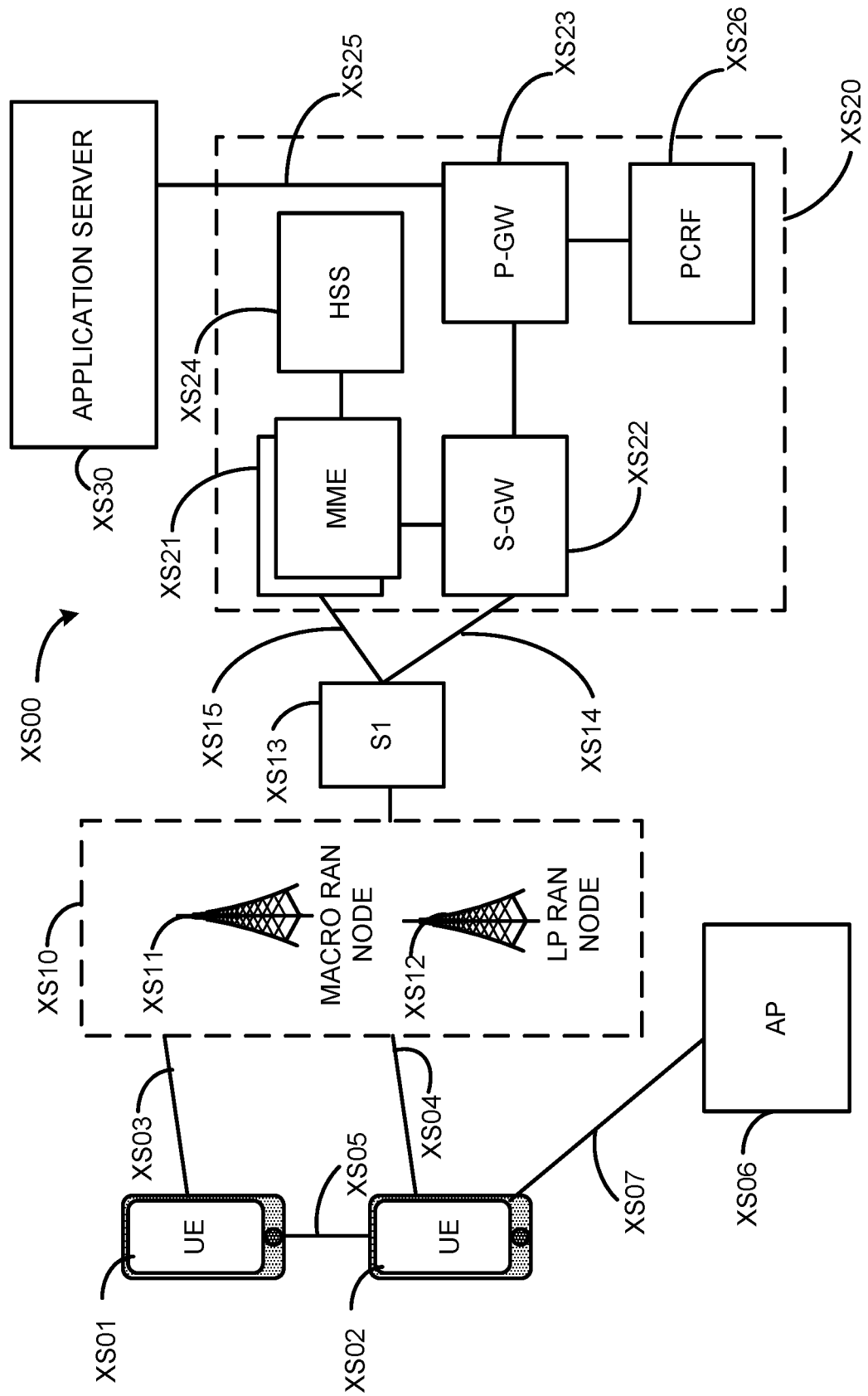
FIG. 6 illustrates an architecture of a system of a network in accordance with some embodiments.

FIG. 6 illustrates an architecture of a system XS00 of a network in accordance with some embodiments. The system XS00 is shown to include a user equipment (UE) XS01 and a UE XS02. The UEs XS01 and XS02 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs XS01 and XS02 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs XS01 and XS02 may be configured to connect, e.g., communicatively couple, with a radio access network (RAN) XS10—the RAN XS10 may be, for example, an Evolved Universal Mobile Telecommunications System (UMTS) Terrestrial Radio Access Network (E-UTRAN), a NextGen RAN (NG RAN), or some other type of RAN. The UEs XS01 and XS02 utilize connections XS03 and XS04, respectively, each of which comprises a physical communications interface or layer (discussed in further detail below); in this example, the connections XS03 and XS04 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs XS01 and XS02 may further directly exchange communication data via a ProSe interface XS05. The ProSe interface XS05 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE XS02 is shown to be configured to access an access point (AP) XS06 via connection XS07. The connection XS07 can comprise a local wireless connection, such as a connection consistent with any IEEE 802.11 protocol, wherein the AP XS06 would comprise a wireless fidelity (WiFi®) router. In this example, the AP XS06 is shown to be connected to the Internet without connecting to the core network of the wireless system (described in further detail below).

The RAN XS10 can include one or more access nodes that enable the connections XS03 and XS04. These access nodes (ANs) can be referred to as base stations (BSs), NodeBs, evolved NodeBs (eNBs), next Generation NodeBs (gNB), next generation evolved NodeBs (ng-eNB), RAN nodes, and so forth, and can comprise ground stations (e.g., terrestrial access points) or satellite stations providing coverage within a geographic area (e.g., a cell). The RAN XS10 may include one or more RAN nodes for providing macrocells, e.g., macro RAN node XS11, and one or more RAN nodes for providing femtocells or picocells (e.g., cells having smaller coverage areas, smaller user capacity, or higher bandwidth compared to macrocells), e.g., low power (LP) RAN node XS12.

Any of the RAN nodes XS11 and XS12 can terminate the air interface protocol and can be the first point of contact for the UEs XS01 and XS02. In some embodiments, any of the RAN nodes XS11 and XS12 can fulfill various logical functions for the RAN XS10 including, but not limited to, radio network controller (RNC) functions such as radio bearer management, uplink and downlink dynamic radio resource management and data packet scheduling, and mobility management.

In accordance with some embodiments, the UEs XS01 and XS02 can be configured to communicate using Orthogonal Frequency-Division Multiplexing (OFDM) communication signals with each other or with any of the RAN nodes XS11 and XS12 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes XS11 and XS12 to the UEs XS01 and XS02, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs XS01 and XS02. The physical downlink control channel (PDCCH) may carry information about the transport format and resource allocations related to the PDSCH channel, among other things. It may also inform the UEs XS01 and XS02 about the transport format, resource allocation, and H-ARQ (Hybrid Automatic Repeat Request) information related to the uplink shared channel. Typically, downlink scheduling (assigning control and shared channel resource blocks to the UE XS01 and XS02 within a cell) may be performed at any of the RAN nodes XS11 and XS12 based on channel quality information fed back from any of the UEs XS01 and XS02. The downlink resource assignment information may be sent on the PDCCH used for (e.g., assigned to) each of the UEs XS01 and XS02.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN XS10 is shown to be communicatively coupled to a core network (CN) XS20—via an S1 interface XS13. In embodiments, the CN XS20 may be an evolved packet core (EPC) network, a NextGen Packet Core (NPC) network, or some other type of CN. In this embodiment the S1 interface XS13 is split into two parts: the S1-U interface XS14, which carries traffic data between the RAN nodes XS11 and XS12 and the serving gateway (S-GW) XS22, and the S1-mobility management entity (MME) interface XS15, which is a signaling interface between the RAN nodes XS11 and XS12 and MMEs XS21.

In this embodiment, the CN XS20 comprises the MMEs XS21, the S-GW XS22, the Packet Data Network (PDN) Gateway (P-GW) XS23, and a home subscriber server (HSS) XS24. The MMEs XS21 may be similar in function to the control plane of legacy Serving General Packet Radio Service (GPRS) Support Nodes (SGSN). The MMEs XS21 may manage mobility aspects in access such as gateway selection and tracking area list management. The HSS XS24 may comprise a database for network users, including subscription-related information to support the network entities' handling of communication sessions. The CN XS20 may comprise one or several HSSs XS24, depending on the number of mobile subscribers, on the capacity of the equipment, on the organization of the network, etc. For example, the HSS XS24 can provide support for routing/roaming, authentication, authorization, naming/addressing resolution, location dependencies, etc.

The S-GW XS22 may terminate the S1 interface XS13 towards the RAN XS10, and routes data packets between the RAN XS10 and the CN XS20. In addition, the S-GW XS22 may be a local mobility anchor point for inter-RAN node handovers and also may provide an anchor for inter-3GPP mobility. Other responsibilities may include lawful intercept, charging, and some policy enforcement.

The P-GW XS23 may terminate an SGi interface toward a PDN. The P-GW XS23 may route data packets between the EPC network XS23 and external networks such as a network including the application server XS30 (alternatively referred to as application function (AF)) via an Internet Protocol (IP) interface XS25. Generally, the application server XS30 may be an element offering applications that use IP bearer resources with the core network (e.g., UMTS Packet Services (PS) domain, LTE PS data services, etc.). In this embodiment, the P-GW XS23 is shown to be communicatively coupled to an application server XS30 via an IP communications interface XS25. The application server XS30 can also be configured to support one or more communication services (e.g., Voice-over-Internet Protocol (VoIP) sessions, PTT sessions, group communication sessions, social networking services, etc.) for the UEs XS01 and XS02 via the CN XS20.

The P-GW XS23 may further be a node for policy enforcement and charging data collection. Policy and Charging Enforcement Function (PCRF) XS26 is the policy and charging control element of the CN XS20. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF XS26 may be communicatively coupled to the application server XS30 via the P-GW XS23. The application server XS30 may signal the PCRF XS26 to indicate a new service flow and select the appropriate Quality of Service (QoS) and charging parameters. The PCRF XS26 may provision this rule into a Policy and Charging Enforcement Function (PCEF) (not shown) with the appropriate traffic flow template (TFT) and QoS class of identifier (QCI), which commences the QoS and charging as specified by the application server XS30.

FIG. 7 illustrates an architecture of a system XR00 of a network in accordance with some embodiments. The system XR00 is shown to include a UE XR01, which may be the same or similar to UEs XS01 and XS02 discussed previously; a RAN node XR11, which may be the same or similar to RAN nodes XS11 and XS12 discussed previously; a User Plane Function (UPF) XR02; a Data network (DN) XR03, which may be, for example, operator services, Internet access or 3rd party services; and a 5G Core Network (5GC or CN) XR20.

The CN XR20 may include an Authentication Server Function (AUSF) XR22; a Core Access and Mobility Management Function (AMF) XR21; a Session Management Function (SMF) XR24; a Network Exposure Function (NEF) XR23; a Policy Control function (PCF) XR26; a Network Function (NF) Repository Function (NRF) XR25; a Unified Data Management (UDM) XR27; and an Application Function (AF) XR28. The CN XR20 may also include other elements that are not shown, such as a Structured Data Storage network function (SDSF), an Unstructured Data Storage network function (UDSF), and the like.

The UPF XR02 may act as an anchor point for intra-RAT and inter-RAT mobility, an external PDU session point of interconnect to DN XR03, and a branching point to support multi-homed PDU session. The UPF XR02 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF XR02 may include an uplink classifier to support routing traffic flows to a data network. The DN XR03 may represent various network operator services, Internet access, or third party services. NY XR03 may include, or be similar to application server XS30 discussed previously.

The AUSF XR22 may store data for authentication of UE XR01 and handle authentication related functionality. The AUSF XR22 may facilitate a common authentication framework for various access types.

The AMF XR21 may be responsible for registration management (e.g., for registering UE XR01, etc.), connection management, reachability management, mobility management, and lawful interception of AMF-related events, and access authentication and authorization. AMF XR21 may provide transport for SM messages between and SMF XR24, and act as a transparent proxy for routing SM messages. AMF XR21 may also provide transport for short message service (SMS) messages between UE XR01 and an SMS function (SMSF) (not shown by FIG. 7). AMF XR21 may act as Security Anchor Function (SEA), which may include interaction with the AUSF XR22 and the UE XR01, receipt of an intermediate key that was established as a result of the UE XR01 authentication process. Where USIM based authentication is used, the AMF XR21 may retrieve the security material from the AUSF XR22. AMF XR21 may also include a Security Context Management (SCM) function, which receives a key from the SEA that it uses to derive access-network specific keys. Furthermore, AMF XR21 may be a termination point of RAN CP interface (N2 reference point), a termination point of NAS (N1) signalling, and perform NAS ciphering and integrity protection.

AMF XR21 may also support NAS signalling with a UE XR01 over an N3 interworking-function (IWF) interface. The N3IWF may be used to provide access to untrusted entities. N33IWF may be a termination point for the N2 and N3 interfaces for control plane and user plane, respectively, and as such, may handle N2 signalling from SMF and AMF for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated to such marking received over N2. N3IWF may also relay uplink and downlink control-plane NAS (N1) signalling between the UE XR01 and AMF XR21, and relay uplink and downlink user-plane packets between the UE XR01 and UPF XR02. The N3IWF also provides mechanisms for IPsec tunnel establishment with the UE XR01.

The SMF XR24 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF XR24 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signalling for PDU session authorization/authentication by external DN.

The NEF XR23 may provide means for securely exposing the services and capabilities provided by 3GPP network functions for third party, internal exposure/re-exposure, Application Functions (e.g., AF XR28), edge computing or fog computing systems, etc. In such embodiments, the NEF XR23 may authenticate, authorize, and/or throttle the AFs. NEF XR23 may also translate information exchanged with the AF XR28 and information exchanged with internal network functions. For example, the NEF XR23 may translate between an AF-Service-Identifier and an internal 5GC information. NEF XR23 may also receive information from other network functions (NFs) based on exposed capabilities of other network functions. This information may be stored at the NEF XR23 as structured data, or at a data storage NF using a standardized interfaces. The stored information can then be re-exposed by the NEF XR23 to other NFs and AFs, and/or used for other purposes such as analytics.

The NRF XR25 may support service discovery functions, receive NF Discovery Requests from NF instances, and provide the information of the discovered NF instances to the NF instances. NRF XR25 also maintains information of available NF instances and their supported services.

The PCF XR26 may provide policy rules to control plane function(s) to enforce them, and may also support unified policy framework to govern network behaviour. The PCF XR26 may also implement a front end (FE) to access subscription information relevant for policy decisions in a UDR of UDM XR27.

The UDM XR27 may handle subscription-related information to support the network entities' handling of communication sessions, and may store subscription data of UE XR01. The UDM XR27 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF XR26. UDM XR27 may also support SMS management, wherein an SMS-FE implements the similar application logic as discussed previously.

The AF XR28 may provide application influence on traffic routing, access to the Network Capability Exposure (NCE), and interact with the policy framework for policy control. The NCE may be a mechanism that allows the 5GC and AF XR28 to provide information to each other via NEF XR23, which may be used for edge computing implementations. In such implementations, the network operator and third party services may be hosted close to the UE XR01 access point of attachment to achieve an efficient service delivery through the reduced end-to-end latency and load on the transport network. For edge computing implementations, the 5GC may select a UPF XR02 close to the UE XR01 and execute traffic steering from the UPF XR02 to DN XR03 via the N6 interface. This may be based on the UE subscription data, UE location, and information provided by the AF XR28. In this way, the AF XR28 may influence UPF (re)selection and traffic routing. Based on operator deployment, when AF XR28 is considered to be a trusted entity, the network operator may permit AF XR28 to interact directly with relevant NFs.

As discussed previously, the CN XR20 may include an SMSF, which may be responsible for SMS subscription checking and verification, and relaying SM messages to/from the UE XR01 to/from other entities, such as an SMS-GMSC/IWMSC/SMS-router. The SMS may also interact with AMF XR21 and UDM XR27 for notification procedure that the UE XR01 is available for SMS transfer (e.g., set a UE not reachable flag, and notifying UDM XR27 when UE XR01 is available for SMS).

The system XR00 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system XR00 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an N5 reference point may be between the PCF and the AF; an N7 reference point may be between the PCF and the SMF; an N11 reference point between the AMF and SMF; etc. In some embodiments, the CN XR20 may include an Nx interface, which is an inter-CN interface between the MME (e.g., MME XS21) and the AMF XR21 in order to enable interworking between CN XR20 and CN XS20.

Although not shown by FIG. 7, system XR00 may include multiple RAN nodes XR11 wherein an Xn interface is defined between two or more RAN nodes XR11 (e.g., gNBs and the like) that connecting to 5GC XR20, between a RAN node XR11 (e.g., gNB) connecting to 5GC XR20 and an eNB (e.g., a RAN node XS11 of FIG. 6), and/or between two eNBs connecting to 5GC XR20.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE XR01 in a connected mode (e.g., CM-CONNECTED) including functionality to manage the UE mobility for connected mode between one or more RAN nodes XR11. The mobility support may include context transfer from an old (source) serving RAN node XR11 to new (target) serving RAN node XR11; and control of user plane tunnels between old (source) serving RAN node XR11 to new (target) serving RAN node XR11.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 8:
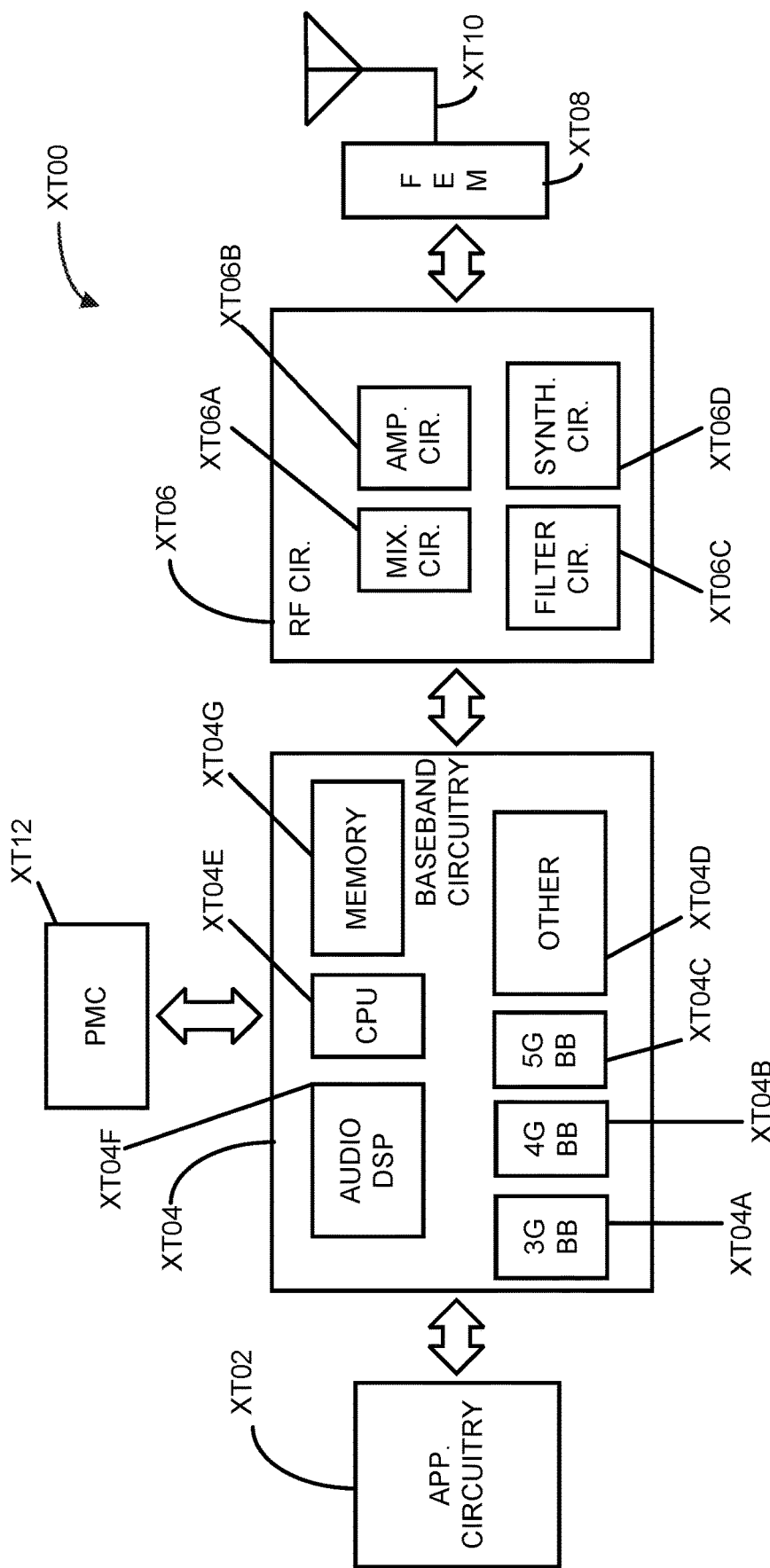
FIG. 8 illustrates example components of a device in accordance with some embodiments.

FIG. 8 illustrates example components of a device XT00 in accordance with some embodiments. In some embodiments, the device XT00 may include application circuitry XT02, baseband circuitry XT04, Radio Frequency (RF) circuitry XT06, front-end module (FEM) circuitry XT08, one or more antennas XT10, and power management circuitry (PMC) XT12 coupled together at least as shown. The components of the illustrated device XT00 may be included in a UE or a RAN node. In some embodiments, the device XT00 may include less elements (e.g., a RAN node may not utilize application circuitry XT02, and instead include a processor/controller to process IP data received from an EPC). In some embodiments, the device XT00 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry XT02 may include one or more application processors. For example, the application circuitry XT02 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device XT00. In some embodiments, processors of application circuitry XT02 may process IP data packets received from an EPC.

The baseband circuitry XT04 may include circuitry such as, but not limited to, one or more single-core or multi-core processors. The baseband circuitry XT04 may include one or more baseband processors or control logic to process baseband signals received from a receive signal path of the RF circuitry XT06 and to generate baseband signals for a transmit signal path of the RF circuitry XT06. Baseband processing circuity XT04 may interface with the application circuitry XT02 for generation and processing of the baseband signals and for controlling operations of the RF circuitry XT06. For example, in some embodiments, the baseband circuitry XT04 may include a third generation (3G) baseband processor XT04A, a fourth generation (4G) baseband processor XT04B, a fifth generation (5G) baseband processor XT04C, or other baseband processor(s) XT04D for other existing generations, generations in development or to be developed in the future (e.g., second generation (2G), sixth generation (6G), etc.). The baseband circuitry XT04 (e.g., one or more of baseband processors XT04A-D) may handle various radio control functions that enable communication with one or more radio networks via the RF circuitry XT06. In other embodiments, some or all of the functionality of baseband processors XT04A-D may be included in modules stored in the memory XT04G and executed via a Central Processing Unit (CPU) XT04E. The radio control functions may include, but are not limited to, signal modulation/demodulation, encoding/decoding, radio frequency shifting, etc. In some embodiments, modulation/demodulation circuitry of the baseband circuitry XT04 may include Fast-Fourier Transform (FFT), precoding, or constellation mapping/demapping functionality. In some embodiments, encoding/decoding circuitry of the baseband circuitry XT04 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry XT04 may include one or more audio digital signal processor(s) (DSP) XT04F. The audio DSP(s) XT04F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry XT04 and the application circuitry XT02 may be implemented together such as, for example, on a system on a chip (SOC).

In some embodiments, the baseband circuitry XT04 may provide for communication compatible with one or more radio technologies. For example, in some embodiments, the baseband circuitry XT04 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry XT04 is configured to support radio communications of more than one wireless protocol may be referred to as multi-mode baseband circuitry.

RF circuitry XT06 may enable communication with wireless networks using modulated electromagnetic radiation through a non-solid medium. In various embodiments, the RF circuitry XT06 may include switches, filters, amplifiers, etc. to facilitate the communication with the wireless network. RF circuitry XT06 may include a receive signal path which may include circuitry to down-convert RF signals received from the FEM circuitry XT08 and provide baseband signals to the baseband circuitry XT04. RF circuitry XT06 may also include a transmit signal path which may include circuitry to up-convert baseband signals provided by the baseband circuitry XT04 and provide RF output signals to the FEM circuitry XT08 for transmission.

In some embodiments, the receive signal path of the RF circuitry XT06 may include mixer circuitry XT06a, amplifier circuitry XT06b and filter circuitry XT06c. In some embodiments, the transmit signal path of the RF circuitry XT06 may include filter circuitry XT06c and mixer circuitry XT06a. RF circuitry XT06 may also include synthesizer circuitry XT06d for synthesizing a frequency for use by the mixer circuitry XT06a of the receive signal path and the transmit signal path. In some embodiments, the mixer circuitry XT06a of the receive signal path may be configured to down-convert RF signals received from the FEM circuitry XT08 based on the synthesized frequency provided by synthesizer circuitry XT06d. The amplifier circuitry XT06b may be configured to amplify the down-converted signals and the filter circuitry XT06c may be a low-pass filter (LPF) or band-pass filter (BPF) configured to remove unwanted signals from the down-converted signals to generate output baseband signals. Output baseband signals may be provided to the baseband circuitry XT04 for further processing. In some embodiments, the output baseband signals may be zero-frequency baseband signals, although this is not a requirement. In some embodiments, mixer circuitry XT06a of the receive signal path may comprise passive mixers, although the scope of the embodiments is not limited in this respect.

In some embodiments, the mixer circuitry XT06a of the transmit signal path may be configured to up-convert input baseband signals based on the synthesized frequency provided by the synthesizer circuitry XT06d to generate RF output signals for the FEM circuitry XT08. The baseband signals may be provided by the baseband circuitry XT04 and may be filtered by filter circuitry XT06c.

In some embodiments, the mixer circuitry XT06a of the receive signal path and the mixer circuitry XT06a of the transmit signal path may include two or more mixers and may be arranged for quadrature downconversion and upconversion, respectively. In some embodiments, the mixer circuitry XT06a of the receive signal path and the mixer circuitry XT06a of the transmit signal path may include two or more mixers and may be arranged for image rejection (e.g., Hartley image rejection). In some embodiments, the mixer circuitry XT06a of the receive signal path and the mixer circuitry XT06a may be arranged for direct downconversion and direct upconversion, respectively. In some embodiments, the mixer circuitry XT06a of the receive signal path and the mixer circuitry XT06a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry XT06 may include analog-to-digital converter (ADC) and digital-to-analog converter (DAC) circuitry and the baseband circuitry XT04 may include a digital baseband interface to communicate with the RF circuitry XT06.

In some dual-mode embodiments, a separate radio IC circuitry may be provided for processing signals for each spectrum, although the scope of the embodiments is not limited in this respect.

In some embodiments, the synthesizer circuitry XT06d may be a fractional-N synthesizer or a fractional N/N+1 synthesizer, although the scope of the embodiments is not limited in this respect as other types of frequency synthesizers may be suitable. For example, synthesizer circuitry XT06d may be a delta-sigma synthesizer, a frequency multiplier, or a synthesizer comprising a phase-locked loop with a frequency divider.

The synthesizer circuitry XT06d may be configured to synthesize an output frequency for use by the mixer circuitry XT06a of the RF circuitry XT06 based on a frequency input and a divider control input. In some embodiments, the synthesizer circuitry XT06d may be a fractional N/N+1 synthesizer.

In some embodiments, frequency input may be provided by a voltage controlled oscillator (VCO), although that is not a requirement. Divider control input may be provided by either the baseband circuitry XT04 or the applications processor XT02 depending on the desired output frequency. In some embodiments, a divider control input (e.g., N) may be determined from a look-up table based on a channel indicated by the applications processor XT02.

Synthesizer circuitry XT06d of the RF circuitry XT06 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry XT06d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry XT06 may include an IQ/polar converter.

FEM circuitry XT08 may include a receive signal path which may include circuitry configured to operate on RF signals received from one or more antennas XT10, amplify the received signals and provide the amplified versions of the received signals to the RF circuitry XT06 for further processing. FEM circuitry XT08 may also include a transmit signal path which may include circuitry configured to amplify signals for transmission provided by the RF circuitry XT06 for transmission by one or more of the one or more antennas XT10. In various embodiments, the amplification through the transmit or receive signal paths may be done solely in the RF circuitry XT06, solely in the FEM XT08, or in both the RF circuitry XT06 and the FEM XT08.

In some embodiments, the FEM circuitry XT08 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry XT06). The transmit signal path of the FEM circuitry XT08 may include a power amplifier (PA) to amplify input RF signals (e.g., provided by RF circuitry XT06), and one or more filters to generate RF signals for subsequent transmission (e.g., by one or more of the one or more antennas XT10).

In some embodiments, the PMC XT12 may manage power provided to the baseband circuitry XT04. In particular, the PMC XT12 may control power-source selection, voltage scaling, battery charging, or DC-to-DC conversion. The PMC XT12 may often be included when the device XT00 is capable of being powered by a battery, for example, when the device is included in a UE. The PMC XT12 may increase the power conversion efficiency while providing desirable implementation size and heat dissipation characteristics.

While FIG. 8 shows the PMC XT12 coupled only with the baseband circuitry XT04. However, in other embodiments, the PMC XT12 may be additionally or alternatively coupled with, and perform similar power management operations for, other components such as, but not limited to, application circuitry XT02, RF circuitry XT06, or FEM XT08.

In some embodiments, the PMC XT12 may control, or otherwise be part of, various power saving mechanisms of the device XT00. For example, if the device XT00 is in an RRC_Connected state, where it is still connected to the RAN node as it expects to receive traffic shortly, then it may enter a state known as Discontinuous Reception Mode (DRX) after a period of inactivity. During this state, the device XT00 may power down for brief intervals of time and thus save power.

If there is no data traffic activity for an extended period of time, then the device XT00 may transition off to an RRC_Idle state, where it disconnects from the network and does not perform operations such as channel quality feedback, handover, etc. The device XT00 goes into a very low power state and it performs paging where again it periodically wakes up to listen to the network and then powers down again. The device XT00 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry XT02 and processors of the baseband circuitry XT04 may be used to execute elements of one or more instances of a protocol stack. For example, processors of the baseband circuitry XT04, alone or in combination, may be used execute Layer 3, Layer 2, or Layer 1 functionality, while processors of the application circuitry XT04 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
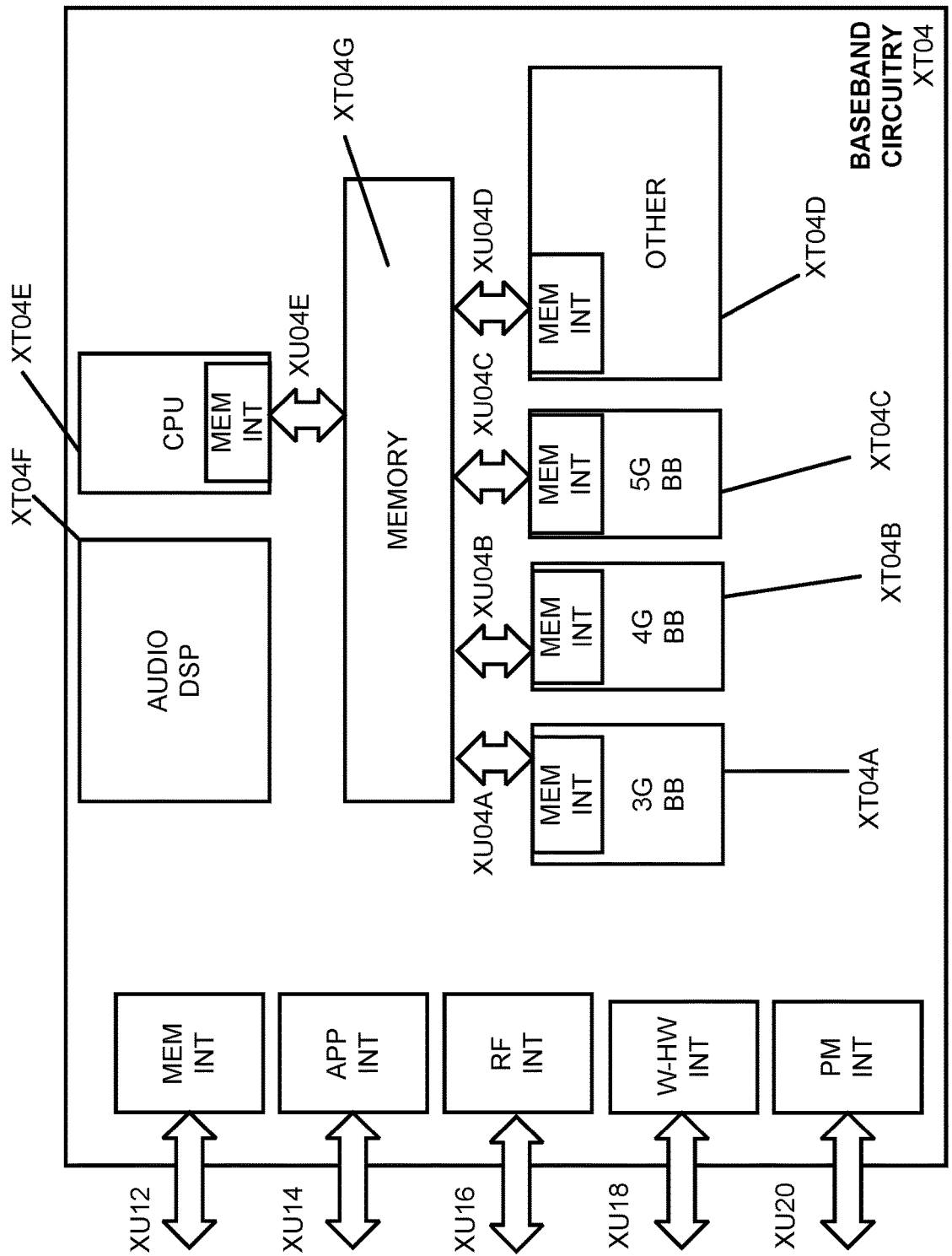
FIG. 9 illustrates example interfaces of baseband circuitry in accordance with some embodiments.

FIG. 9 illustrates example interfaces of baseband circuitry in accordance with some embodiments. As discussed above, the baseband circuitry XT04 of FIG. 8 may comprise processors XT04A-XT04E and a memory XT04G utilized by said processors. Each of the processors XT04A-XT04E may include a memory interface, XU04A-XU04E, respectively, to send/receive data to/from the memory XT04G.

The baseband circuitry XT04 may further include one or more interfaces to communicatively couple to other circuitries/devices, such as a memory interface XU12 (e.g., an interface to send/receive data to/from memory external to the baseband circuitry XT04), an application circuitry interface XU14 (e.g., an interface to send/receive data to/from the application circuitry XT02 of FIG. 8), an RF circuitry interface XU16 (e.g., an interface to send/receive data to/from RF circuitry XT06 of FIG. 8), a wireless hardware connectivity interface XU18 (e.g., an interface to send/receive data to/from Near Field Communication (NFC) components, Bluetooth® components (e.g., Bluetooth® Low Energy), Wi-Fi® components, and other communication components), and a power management interface XU20 (e.g., an interface to send/receive power or control signals to/from the PMC XT12.

Figure 10:
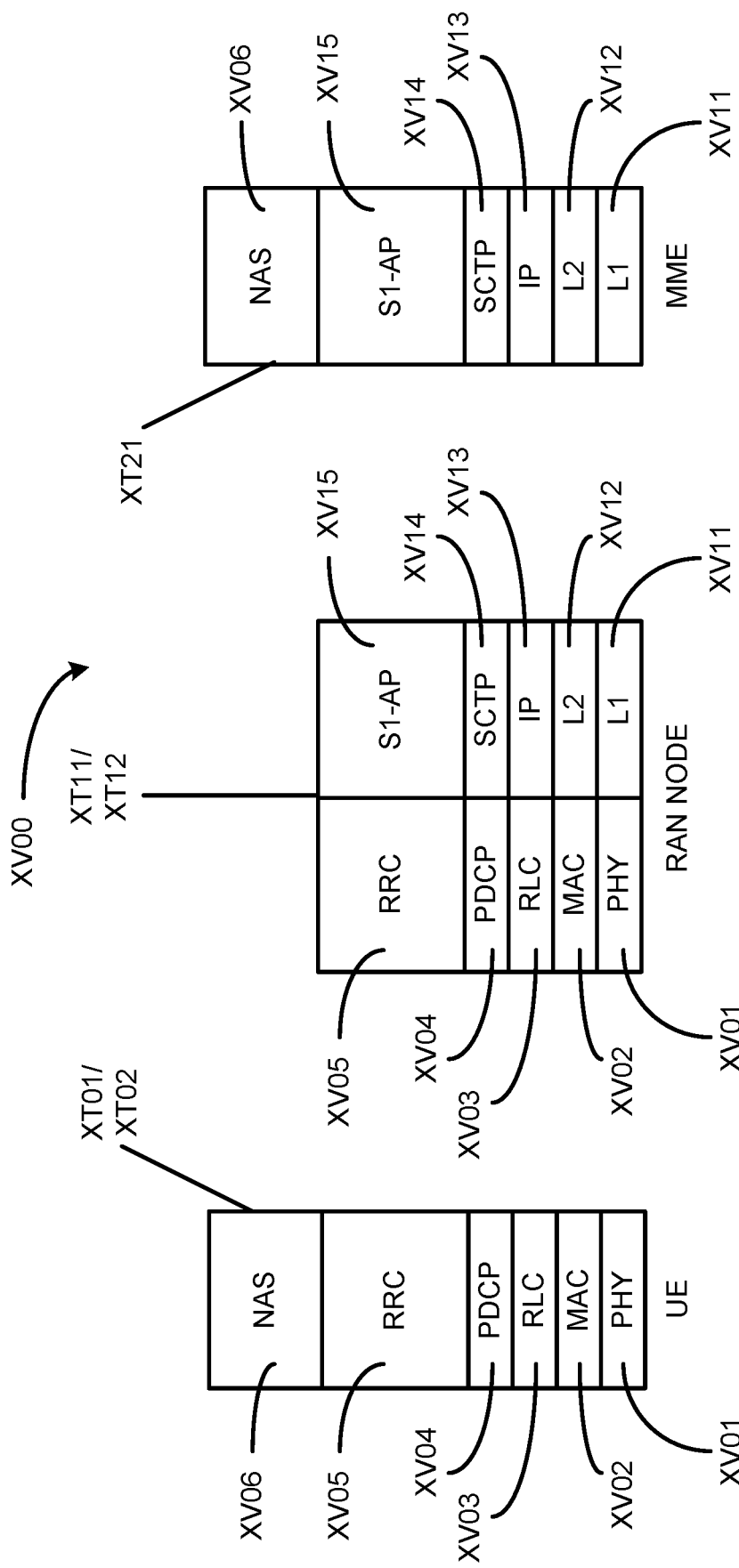
FIG. 10 is an illustration of a control plane protocol stack in accordance with some embodiments.

FIG. 10 is an illustration of a control plane protocol stack in accordance with some embodiments. In this embodiment, a control plane XV00 is shown as a communications protocol stack between the UE XS01 (or alternatively, the UE XS02), the RAN node XS11 (or alternatively, the RAN node XS12), and the MME XS21.

The PHY layer XV01 may transmit or receive information used by the MAC layer XV02 over one or more air interfaces. The PHY layer XV01 may further perform link adaptation or adaptive modulation and coding (AMC), power control, cell search (e.g., for initial synchronization and handover purposes), and other measurements used by higher layers, such as the RRC layer XV05. The PHY layer XV01 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer XV02 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

The RLC layer XV03 may operate in a plurality of modes of operation, including: Transparent Mode (TM), Unacknowledged Mode (UM), and Acknowledged Mode (AM). The RLC layer XV03 may execute transfer of upper layer protocol data units (PDUs), error correction through automatic repeat request (ARQ) for AM data transfers, and concatenation, segmentation and reassembly of RLC SDUs for UM and AM data transfers. The RLC layer XV03 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer XV04 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer XV05 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE XS01 and the RAN node XS11 may utilize a Uu interface (e.g., an LTE-Uu interface) to exchange control plane data via a protocol stack comprising the PHY layer XV01, the MAC layer XV02, the RLC layer XV03, the PDCP layer XV04, and the RRC layer XV05.

The non-access stratum (NAS) protocols XV06 form the highest stratum of the control plane between the UE XS01 and the MME XS21. The NAS protocols XV06 support the mobility of the UE XS01 and the session management procedures to establish and maintain IP connectivity between the UE XS01 and the P-GW XS23.

The S1 Application Protocol (S1-AP) layer XV15 may support the functions of the S1 interface and comprise Elementary Procedures (EPs). An EP is a unit of interaction between the RAN node XS11 and the CN XS20. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) XV14 may ensure reliable delivery of signaling messages between the RAN node XS11 and the MME XS21 based, in part, on the IP protocol, supported by the IP layer XV13. The L2 layer XV12 and the L1 layer XV11 may refer to communication links (e.g., wired or wireless) used by the RAN node and the MME to exchange information.

The RAN node XS11 and the MME XS21 may utilize an S1-MME interface to exchange control plane data via a protocol stack comprising the L1 layer XV11, the L2 layer XV12, the IP layer XV13, the SCTP layer XV14, and the S1-AP layer XV15.

Figure 11:
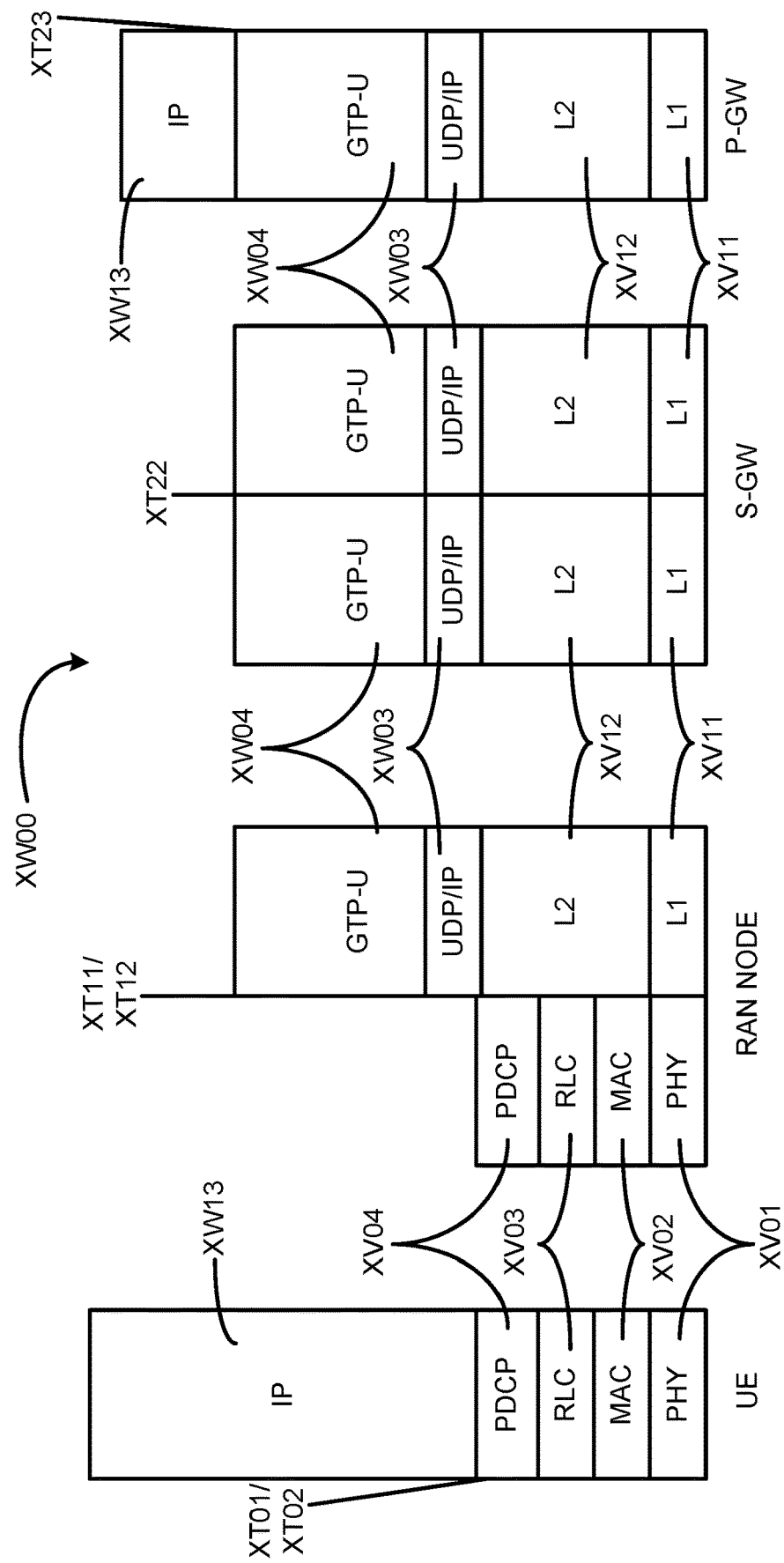
FIG. 11 is an illustration of a user plane protocol stack in accordance with some embodiments.

FIG. 11 is an illustration of a user plane protocol stack in accordance with some embodiments. In this embodiment, a user plane XW00 is shown as a communications protocol stack between the UE XS01 (or alternatively, the UE XS02), the RAN node XS11 (or alternatively, the RAN node XS12), the S-GW XS22, and the P-GW XS23. The user plane XW00 may utilize at least some of the same protocol layers as the control plane XV00. For example, the UE XS01 and the RAN node XS11 may utilize a Uu interface (e.g., an LTE-Uu interface) to exchange user plane data via a protocol stack comprising the PHY layer XV01, the MAC layer XV02, the RLC layer XV03, the PDCP layer XV04.

The General Packet Radio Service (GPRS) Tunneling Protocol for the user plane (GTP-U) layer XW04 may be used for carrying user data within the GPRS core network and between the radio access network and the core network. The user data transported can be packets in any of IPv4, IPv6, or PPP formats, for example. The UDP and IP security (UDP/IP) layer XW03 may provide checksums for data integrity, port numbers for addressing different functions at the source and destination, and encryption and authentication on the selected data flows. The RAN node XS11 and the S-GW XS22 may utilize an S1-U interface to exchange user plane data via a protocol stack comprising the L1 layer XV11, the L2 layer XV12, the UDP/IP layer XW03, and the GTP-U layer XW04. The S-GW XS22 and the P-GW XS23 may utilize an S5/S8a interface to exchange user plane data via a protocol stack comprising the L1 layer XV11, the L2 layer XV12, the UDP/IP layer XW03, and the GTP-U layer XW04. As discussed above with respect to FIG. 10, NAS protocols support the mobility of the UE XS01 and the session management procedures to establish and maintain IP connectivity between the UE XS01 and the P-GW XS23.

Figure 12:
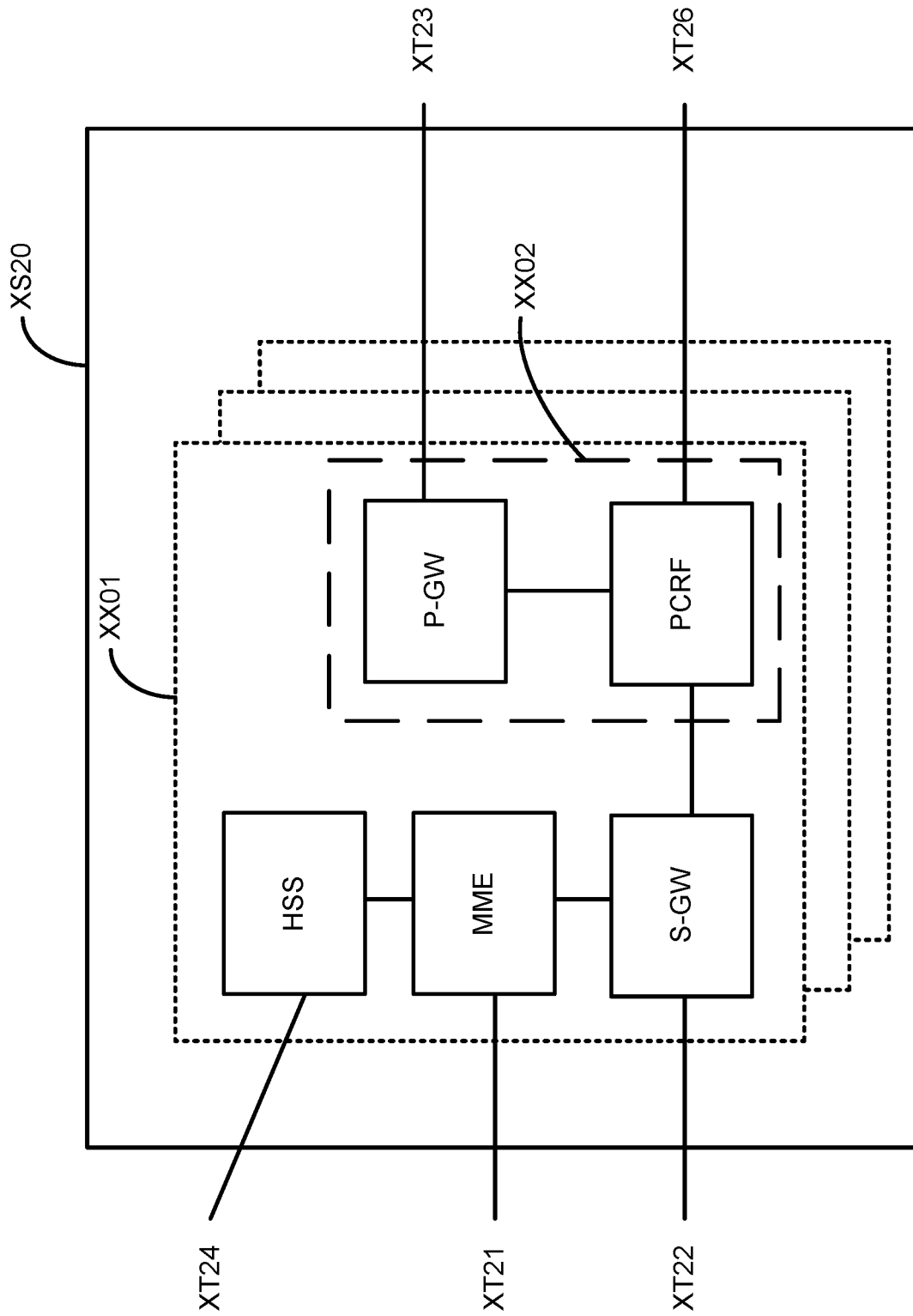
FIG. 12 illustrates components of a core network in accordance with some embodiments.

FIG. 12 illustrates components of a core network in accordance with some embodiments. The components of the CN XS20 may be implemented in one physical node or separate physical nodes including components to read and execute instructions from a machine-readable or computer-readable medium (e.g., a non-transitory machine-readable storage medium). In embodiments, the components of CN XR20 may be implemented in a same or similar manner as discussed herein with regard to the components of CN XS20. In some embodiments, Network Functions Virtualization (NFV) is utilized to virtualize any or all of the above described network node functions via executable instructions stored in one or more computer readable storage mediums (described in further detail below). A logical instantiation of the CN XS20 may be referred to as a network slice XX01. A logical instantiation of a portion of the CN XS20 may be referred to as a network sub-slice XX02 (e.g., the network sub-slice XX02 is shown to include the PGW XS23 and the PCRF XS26).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 13:
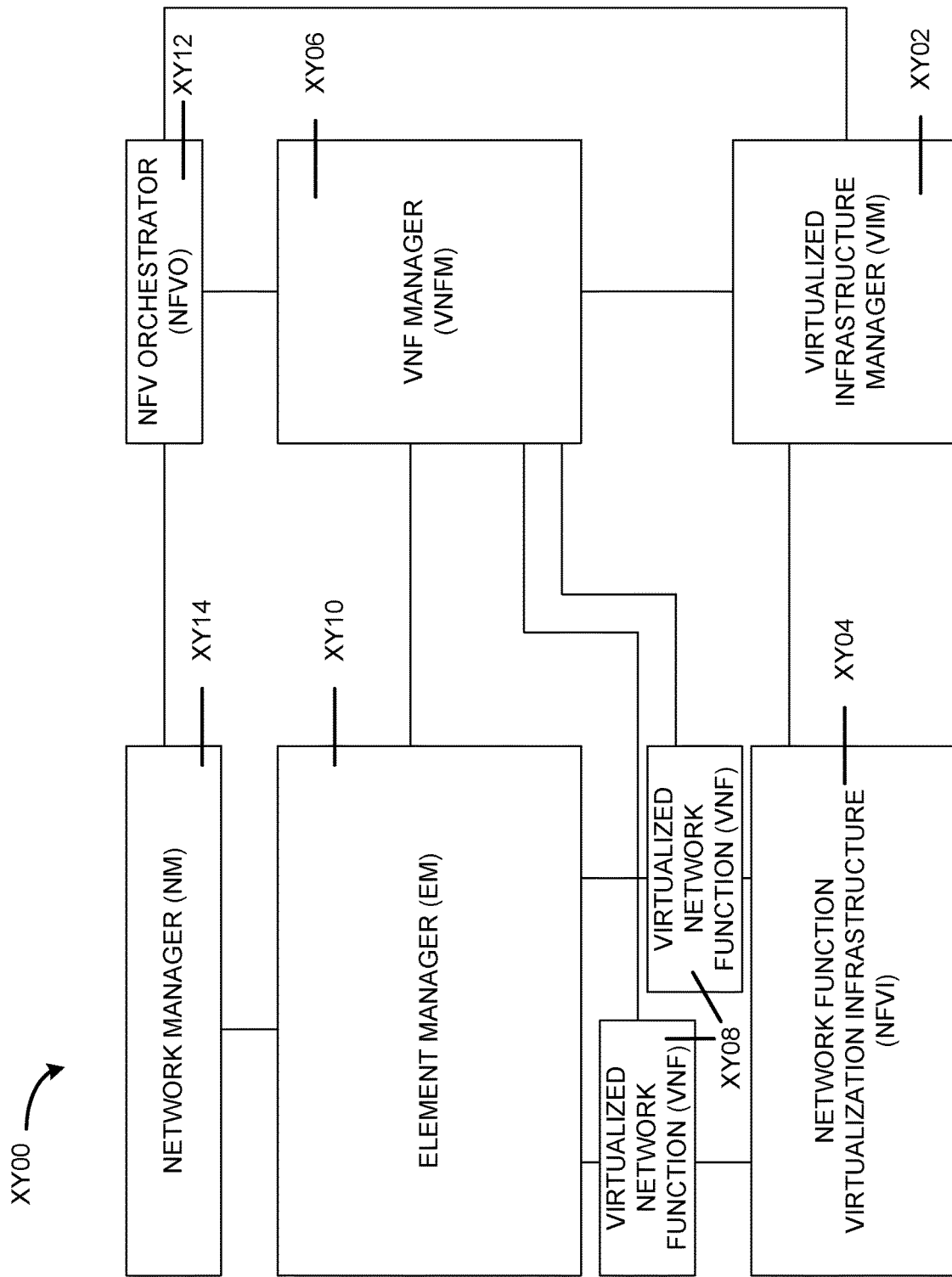
FIG. 13 is a block diagram illustrating components, according to some example embodiments, of a system to support NFV.

FIG. 13 is a block diagram illustrating components, according to some example embodiments, of a system XY00 to support NFV. The system XY00 is illustrated as including a virtualized infrastructure manager (VIM) XY02, a network function virtualization infrastructure (NFVI) XY04, a VNF manager (VNFM) XY06, virtualized network functions (VNFs) XY08, an element manager (EM) XY10, an NFV Orchestrator (NFVO) XY12, and a network manager (NM) XY14.

The VIM XY02 manages the resources of the NFVI XY04. The NFVI XY04 can include physical or virtual resources and applications (including hypervisors) used to execute the system XY00. The VIM XY02 may manage the life cycle of virtual resources with the NFVI XY04 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM XY06 may manage the VNFs XY08. The VNFs XY08 may be used to execute EPC components/functions. The VNFM XY06 may manage the life cycle of the VNFs XY08 and track performance, fault and security of the virtual aspects of VNFs XY08. The EM XY10 may track the performance, fault and security of the functional aspects of VNFs XY08. The tracking data from the VNFM XY06 and the EM XY10 may comprise, for example, performance measurement (PM) data used by the VIM XY02 or the NFVI XY04. Both the VNFM XY06 and the EM XY10 can scale up/down the quantity of VNFs of the system XY00.

The NFVO XY12 may coordinate, authorize, release and engage resources of the NFVI XY04 in order to provide the requested service (e.g., to execute an EPC function, component, or slice). The NM XY14 may provide a package of end-user functions with the responsibility for the management of a network, which may include network elements with VNFs, non-virtualized network functions, or both (management of the VNFs may occur via the EM XY10).

Figure 14:
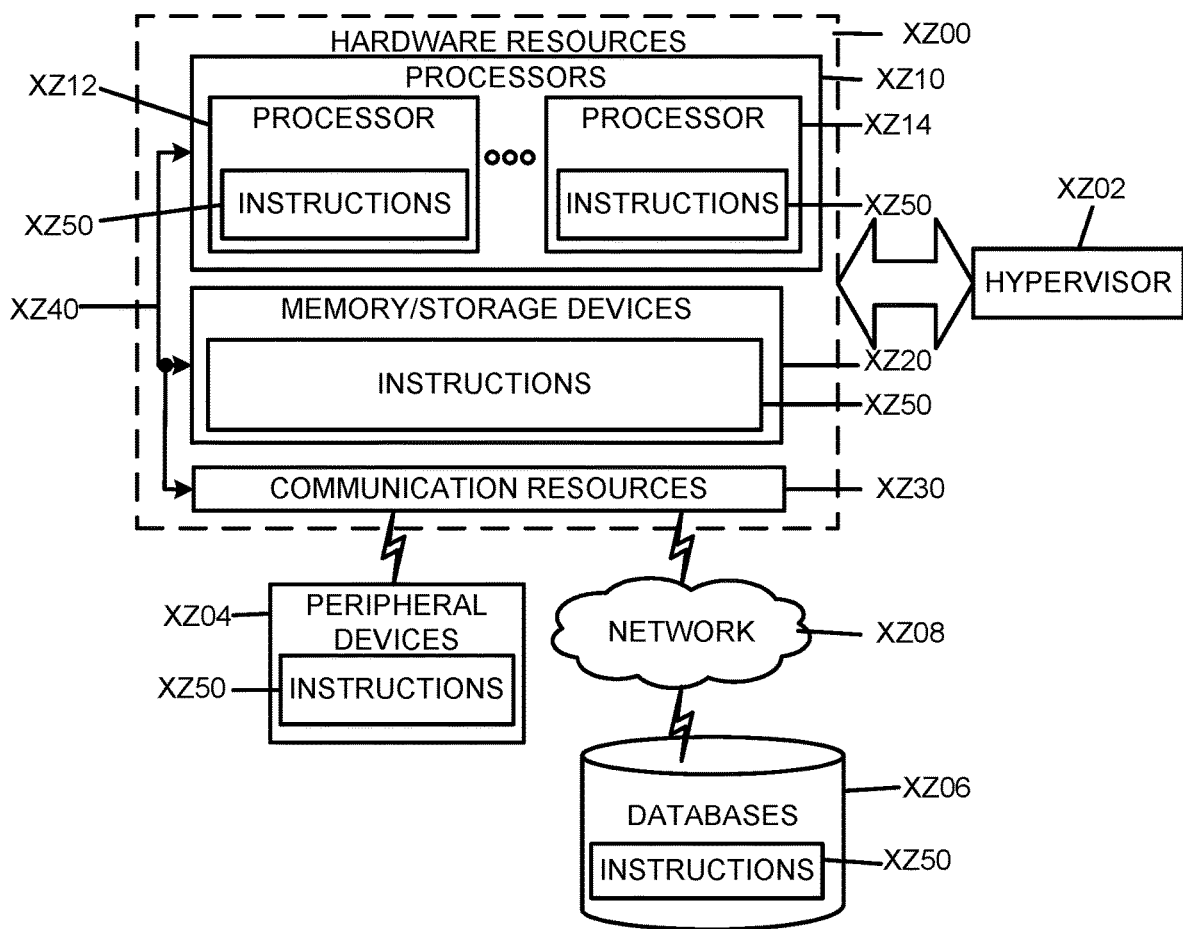
FIG. 14 is a block diagram illustrating components, according to some example embodiments, able to read instructions from a machine-readable or computer-readable medium (e.g., a non-transitory machine-readable storage medium) and perform any one or more of the methodologies discussed herein.

FIG. 14 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources XZ00 including one or more processors (or processor cores) XZ10, one or more memory/storage devices XZ20, and one or more communication resources XZ30, each of which may be communicatively coupled via a bus XZ40. For embodiments where node virtualization (e.g., NFV) is utilized, a hypervisor XZ02 may be executed to provide an execution environment for one or more network slices/sub-slices to utilize the hardware resources XZ00

The processors XZ10 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor XZ12 and a processor XZ14.

The memory/storage devices XZ20 may include main memory, disk storage, or any suitable combination thereof. The memory/storage devices XZ20 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources XZ30 may include interconnection or network interface components or other suitable devices to communicate with one or more peripheral devices XZ04 or one or more databases XZ06 via a network XZ08. For example, the communication resources XZ30 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions XZ50 may comprise software, a program, an application, an applet, an app, or other executable code for causing at least any of the processors XZ10 to perform any one or more of the methodologies discussed herein. The instructions XZ50 may reside, completely or partially, within at least one of the processors XZ10 (e.g., within the processor's cache memory), the memory/storage devices XZ20, or any suitable combination thereof. Furthermore, any portion of the instructions XZ50 may be transferred to the hardware resources XZ00 from any combination of the peripheral devices XZ04 or the databases XZ06. Accordingly, the memory of processors XZ10, the memory/storage devices XZ20, the peripheral devices XZ04, and the databases XZ06 are examples of computer-readable and machine-readable media.

In some embodiments, the electronic device(s), network(s), system(s), chip(s) or component(s), or portions or implementations thereof, of any other figure herein may be configured to perform one or more processes, techniques, or methods as described herein, or portions thereof.

Example 1 may include Distributed United (DU) of a gNB or ng-eNB, configured to receive from a Centralized Unit (CU) of a gNB or ng-eNB a plurality of TNL addresses. The said DU further configured to establish a plurality of SCTP associations using the said TNL addresses.

Example 2 may include the DU of example 1 or some other example herein, further configured to receive the said plurality of TNL addresses via the F1 SETUP RESPONSE F1-AP message or the GNB-CU CONFIGURATION UPDATE F1-AP message.

Example 3 may include the DU of example 1 or some other example herein, further configured to distribute UE-associated messages between the plurality of the said established SCTP associations between the said DU and the said CU.

Example 4 may include the DU of example 1 or some other example herein, wherein further configured to receive an updated list of TNL addresses, including new addresses to be used of the newly instantiated CU instances and addresses of shut down CU instances, which shall not be used anymore.

Example 5 may include an apparatus to be employed as a Distributed Unit (DU), the apparatus comprising: communication means for receiving an F1 application protocol (F1-AP) message from a centralized unit (CU) over an F1 interface, wherein the F1-AP message is to include a plurality of Transport Network Layer (TNL) addresses, and means for establishing a plurality of Stream Control Transmission Protocol (SCTP) associations using the plurality of TNL addresses.

Example 6 may include the apparatus of example 5 or some other example herein, wherein the F1-AP message is an F1 SETUP RESPONSE F1-AP message or the GNB-CU CONFIGURATION UPDATE F1-AP message.

Example 7 may include the apparatus of examples 5-6 or some other example herein, further comprising load balancing means for implementing load balancing between the CU and DU.

Example 8 may include the apparatus of example 7 or some other example herein, wherein the load balancing means is for randomly selecting an SCTP association for every user equipment (UE) to be used by the DU and the CU.

Example 9 may include the apparatus of example 7 or some other example herein, wherein the load balancing means is for using an SCTP association for every UE that is randomly selected by the CU.

Example 10 may include the apparatus of example 9 or some other example herein, wherein the communication means is for receiving an F1AP message that is to indicate the SCTP association that was randomly selected by the CU.

Example 11 may include the apparatus of example 7 or some other example herein, wherein the load balancing means is for designating one SCTP association to be a load balancing SCTP association, and the communication means is for sending a first uplink (UL) message via the load balancing SCTP association; and for receiving a reply message via another SCTP association to be used for an individual UE by both the DU and the CU.

Example 12 may include the apparatus of example 7 or some other example herein, wherein the communication means is for receiving an indication of weight factors for the SCTP associations from the CU, and the load balancing means are for applying the weight factors to the SCTP associations in an SCTP association selection procedure such that SCTP association with a higher weight than other SCTP associations has higher likelihood of being selected over the other SCTP associations.

Example 13 may include the apparatus of example 5 or some other example herein, wherein the communication means is for sending UE-associated messages between the plurality of established SCTP associations between the DU and the CU.

Example 14 may include the apparatus of example 5 or some other example herein, wherein the communication means is for receiving another F1-AP message, the other F1-AP message to include an updated list of TNL addresses, wherein the updated list of TNL address comprise new addresses to be used for newly instantiated CU instances and addresses of shut down CU instances that are not be used anymore.

Example 15 may include the apparatus of examples 5-14 or some other example herein, wherein the apparatus is implemented in or by a next generation NodeB (gNB) or next generation evolved NodeB (ng-eNB).

Example 16 may include an apparatus comprising means to perform one or more elements of a method described in or related to any of examples 1-15, or any other method or process described herein.

Example 17 may include one or more non-transitory computer-readable media comprising instructions to cause an electronic device, upon execution of the instructions by one or more processors of the electronic device, to perform one or more elements of a method described in or related to any of examples 1-15, or any other method or process described herein.

Example 18 may include an apparatus comprising logic, modules, or circuitry to perform one or more elements of a method described in or related to any of examples 1-15, or any other method or process described herein.

Example 19 may include a method, technique, or process as described in or related to any of examples 1-15, or portions or parts thereof.

Example 20 may include an apparatus comprising: one or more processors and one or more computer readable media comprising instructions that, when executed by the one or more processors, cause the one or more processors to perform the method, techniques, or process as described in or related to any of examples 1-15, or portions thereof.

Example 21 may include a signal as described in or related to any of examples 1-15, or portions or parts thereof.

Example 22 may include a signal in a wireless network as shown and described herein.

Example 23 may include a method of communicating in a wireless network as shown and described herein.

Example 24 may include a system for providing wireless communication as shown and described herein.

Example 25 may include a device for providing wireless communication as shown and described herein.

Example 26 may include one or more non-transitory computer-readable media having instructions stored thereon, wherein the instructions, in response to execution by one or more processors cause a centralized unit (CU) of an access node to generate a CU configuration update message, the CU configuration update message to include an indication of a transport network layer (TNL) address of the CU for which a TNL association between the CU and a distributed unit (DU) of the access node is to be added or removed, and cause the CU configuration update message to be transmitted to the DU.

Example 27 may include the one or more non-transitory computer-readable media of example 26, wherein the CU configuration update message is to further include a list of TNL associations to be added or removed between the CU and the DU.

Example 28 may include the one or more non-transitory computer-readable media of example 26, wherein the CU configuration update message indicates to the DU that the TNL association is to be established with the CU via the TNL address.

Example 29 may include the one or more non-transitory computer-readable media of example 26, wherein the CU configuration update message indicates to the DU that the TNL association associated with the TNL address is to be removed.

Example 30 may include the one or more non-transitory computer-readable media of example 26, wherein the TNL association comprises a stream control transmission protocol (SCTP) association.

Example 31 may include the one or more non-transitory computer-readable media of example 26, wherein the access node is a next generation NodeB (gNB), the CU is a CU of the gNB (gNB-CU), the DU is a DU of the gNB (gNB-DU), and the CU configuration update message is a gNB-CU configuration update message.

Example 32 may include the one or more non-transitory computer-readable media of example 26, wherein the CU configuration update message is generated in response to an instantiation of a computational resource of the CU.

Example 33 may include the one or more non-transitory computer-readable media of example 26, wherein the CU configuration update message further includes an indication that the TNL association is to be used for load balancing.

Example 34 may include an apparatus for a centralized unit (CU) of an access node, comprising circuitry to generate a CU configuration update message, the CU configuration update message including an indication of a transport network layer (TNL) address to be utilized by a distributed unit (DU) of the access node to add a TNL association between the CU and the DU, and memory coupled to the circuitry, the memory to store the CU configuration update message for transmission to the DU.

Example 35 may include the apparatus of example 34, wherein the CU configuration update message further includes a list of TNL associations to be established between the CU and the DU.

Example 36 may include the apparatus of example 34, wherein the TNL association comprises a stream control transmission protocol (SCTP) association.

Example 37 may include the apparatus of example 34, wherein the circuitry is further to detect instantiation of a computational resource of the CU, and wherein the CU configuration update message is generated in response to detection of the instantiation of the computational resource.

Example 38 may include the apparatus of example 34, wherein the access node is a next generation NodeB (gNB), the CU is a CU of the gNB (gNB-CU), the DU is a DU of the gNB (gNB-DU), and the CU configuration update message is a gNB-CU configuration update message.

Example 39 may include the apparatus of example 34, wherein the CU configuration update message further includes an indication that the TNL association is to be used for load balancing.

Example 40 may include an apparatus for a centralized unit (CU) of an access node, comprising circuitry to generate a CU configuration update message, the CU configuration update message including an indication of a transport network layer (TNL) address for which distributed unit (DU) of the access node is to remove a TNL association between the CU and the DU, and memory coupled to the circuitry, the memory to store the CU configuration update message for transmission to the DU.

Example 41 may include the apparatus of example 40, wherein the CU configuration update message further includes a list of TNL associations that the DU is to remove.

Example 42 may include the apparatus of example 40, wherein the access node is a next generation NodeB (gNB), the CU is a CU of the gNB (gNB-CU), the DU is a DU of the gNB (gNB-DU), and the CU configuration update message is a gNB-CU configuration update message.

Example 43 may include the apparatus of example 40, wherein the circuitry is further to detect shut down of a computational resource of the CU, and wherein the CU configuration update message is generated in response to detection of the shut down of the computational resource of the CU.

Example 44 may include the apparatus of example 40, wherein the CU configuration update message further includes an indication of another TNL association to be used for load balancing.

Example 45 may include the apparatus of example 40, wherein the TNL association comprises a stream control transmission protocol (SCTP) association.

Example 46 may include one or more non-transitory computer-readable media having instructions stored thereon, wherein the instructions, in response to execution by one or more processors, cause a distributed unit (DU) of an access node to detect reception, from a centralized unit (CU) of the access node, of a CU configuration update message, the CU configuration update message to include an indication of a transport network layer (TNL) address of the CU for which a TNL association between the CU and the DU is to be added or removed, and initiate establishment of the TNL association between the CU and the DU via the TNL address or removal of the TNL association in response to detection of the reception of the CU configuration update message.

Example 47 may include the one or more non-transitory computer-readable media of example 46, wherein the CU configuration update message further includes a list of TNL addresses that are to be added or removed.

Example 48 may include the one or more non-transitory computer-readable media of example 46, wherein the access node is a next generation NodeB (gNB), the CU is a CU of the gNB (gNB-CU), the DU is a DU of the gNB (gNB-DU), and the CU configuration update message is a gNB-CU configuration update message.

Example 49 may include a method, comprising generating a centralized unit (CU) configuration update message, the CU configuration update message to include an indication of a transport network layer (TNL) address of a CU of a access node for which a TNL association between the CU and a distributed unit (DU) of the access node is to be added or removed, and causing the CU configuration update message to be transmitted to the DU.

Example 50 may include the method of example 49, wherein the CU configuration update message is to further include a list of TNL associations to be added or removed between the CU and the DU.

Example 51 may include the method of example 49, wherein the CU configuration update message indicates to the DU that the TNL association is to be established with the CU via the TNL address.

Example 52 may include the method of example 49, wherein the gNB-CU configuration update message indicates to the gNB-DU that the TNL association associated with the TNL address is to be removed.

Example 53 may include the method of example 49, wherein the TNL association comprises a stream control transmission protocol (SCTP) association.

Example 54 may include the method of example 49, wherein the access node is a next generation NodeB (gNB), the CU is a CU of the gNB (gNB-CU), the DU is a DU of the gNB (gNB-DU), and the CU configuration update message is a gNB-CU configuration update message.

Example 55 may include the method of example 49, wherein the CU configuration update message is generated in response to an instantiation of a computational resource of the CU.

Example 56 may include a method, comprising generating a centralized unit (CU) configuration update message, the CU configuration update message including an indication of a transport network layer (TNL) address for which a distributed unit (DU) of an access node is to remove a TNL association between the CU and the DU, and storing the CU configuration update message for transmission to the DU.

Example 57 may include the method of example 56, wherein the CU configuration update message further includes a list of TNL associations that the DU is to remove.

Example 58 may include the method of example 56, wherein the access node is a next generation NodeB (gNB), the CU is a CU of the gNB (gNB-CU), the DU is a DU of the gNB (gNB-DU), and the CU configuration update message is a gNB-CU configuration update message.

Example 59 may include the method of example 56, wherein the circuitry is further to detect shut down of a computational resource of the CU, and wherein the CU configuration update message is generated in response to detection of the shut down of the computational resource of the CU.

Example 60 may include the method of example 56, wherein the CU configuration update message further includes an indication of another TNL association to be used for load balancing.

Example 61 may include an apparatus to perform the method of any of the examples 49-60 or some other example.

Example 62 may include means plus function for performing the method of any of the examples 49-60 or some other example.

Example 63 may include one or more computer-readable media having instructions stored thereon, wherein the instructions, in response to execution by one or more processors, cause the one or more processors to perform the method of any of the examples 49-60 or some other example.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. One or more non-transitory computer-readable media having instructions stored thereon, wherein the instructions, in response to execution by one or more processors, cause a centralized unit (CU) of an access node to:
after an F1 setup procedure and in response to a change in one or more computational resources of the CU, generate a CU configuration update message, wherein the CU configuration update message comprises:
a first list of one or more transport network layer (TNL) addresses of the CU for which one or more TNL associations between the CU and a distributed unit (DU) is to be added, and
a second list of one or more TNL addresses of the CU for which one or more TNL associations between the CU and the DU is to be removed;
cause the CU configuration update message to be transmitted to the DU; and
receive, from the DU, a CU configuration update acknowledgment message indicating whether the one or more TNL associations was added or removed.

2. The one or more non-transitory computer-readable media of claim 1, wherein the CU configuration update message further comprises a first information element (IE) comprising the first list of one or more TNL addresses and a second IE comprising the second list of one or more TNL addresses.

3. The one or more non-transitory computer-readable media of claim 1, wherein the CU configuration update message indicates to the DU that the one or more TNL associations is to be established with the CU via the first list of one or more TNL addresses.

4. The one or more non-transitory computer-readable media of claim 1, wherein the CU configuration update message indicates to the DU that the one or more TNL associations associated with the second list of one or more TNL addresses is to be removed.

5. The one or more non-transitory computer-readable media of claim 1, wherein at least one of the one or more TNL associations to be added or the one or more TNL associations to be removed comprises a stream control transmission protocol (SCTP) association.

6. The one or more non-transitory computer-readable media of claim 1, wherein the access node is a next generation NodeB (gNB), the CU is a CU of the gNB (gNB-CU), the DU is a DU of the gNB (gNB-DU), and the CU configuration update message is a gNB-CU configuration update message.

7. The one or more non-transitory computer-readable media of claim 1, wherein the change in the one or more computational resources of the CU comprises an instantiation of an additional computational resource of the CU and the CU configuration update message is generated in response to the instantiation of the additional computational resource of the CU.

8. An apparatus for a centralized unit (CU) of an access node, comprising:
circuitry configured to generate, after an F1 setup procedure and in response to a change in one or more computational resources of the CU, a CU configuration update message, wherein the CU configuration update message comprises:
a first list of one or more transport network layer (TNL) addresses of the CU for which one or more TNL associations between the CU and a distributed unit (DU) is to be added, and
a second list of one or more TNL addresses of the CU for which one or more TNL associations between the CU and the DU is to be removed; and
memory coupled to the circuitry, the memory configured to store the CU configuration update message for transmission to the DU.

9. The one or more non-transitory computer-readable media of claim 1, wherein the change in the one or more computational resources of the CU comprises a shutdown of a computational resource of the CU and the CU configuration update message is generated in response to the shutdown of the computational resource of the CU.

10. The one or more non-transitory computer-readable media of claim 1, wherein the CU configuration update message comprises an information element (IE) including a list of the one or more TNL associations between the CU and the DU that are to be established by the DU.

11. The one or more non-transitory computer-readable media of claim 10, wherein the CU configuration update message further comprises a second IE including a second list of the one or more TNL associations between the CU and the DU that are to be removed by the DU.

12. The one or more non-transitory computer-readable media of claim 1, wherein the CU configuration update message comprises:
a first information element (IE) including a first value that indicates that the one or more TNL associations between the CU and the DU is to be added, and
a second IE including a second value that indicates that the one or more TNL associations between the CU and the DU is to be removed.

13. The apparatus of claim 8, wherein the change in the one or more computational resources of the CU comprises an instantiation of an additional computational resource of the CU, wherein the circuitry is further configured to detect the instantiation of the additional computational resource of the CU, and wherein the CU configuration update message is generated in response to the detection of the instantiation of the additional computational resource.

14. The apparatus of claim 8, wherein the circuitry is further configured to transmit the CU configuration update message to the DU and configured to receive, from the DU, a CU configuration update acknowledgment message indicating whether the TNL associations was added or removed.

15. An apparatus for a centralized unit (CU) of an access node, comprising:
circuitry configured to:
generate, after an F1 setup procedure and in response to a change in one or more computational resources of the CU, a CU configuration update message, wherein the CU configuration update message comprises a first list of one or more transport network layer (TNL) addresses of the CU for which one or more TNL associations between the CU and a distributed unit (DU) is to be removed; and
receive, from the DU, a CU configuration update acknowledgment message indicating that the TNL association was removed; and
memory coupled to the circuitry, the memory configured to store the CU configuration update message for transmission to the DU.

16. The apparatus of claim 15, wherein the CU configuration update message further comprises an information element comprising the one or more TNL associations that the DU is to remove.

17. The apparatus of claim 15, wherein the circuitry is further configured to transmit the CU configuration update message to the DU.

18. The apparatus of claim 15, wherein the change in the one or more computational resources of the CU comprises a shutdown of a computational resource of the CU, wherein the circuitry is further configured to detect the shutdown of the computational resource of the CU, and wherein the CU configuration update message is generated in response to the detection of the shutdown of the computational resource of the CU.

19. The apparatus of claim 15, wherein the CU configuration update message further comprises an indication of another TNL association to be used for load balancing.

20. One or more non-transitory computer-readable media having instructions stored thereon, wherein the instructions, in response to execution by one or more processors, cause a distributed unit (DU) of an access node to:
detect reception, from a centralized unit (CU) of the access node, of a CU configuration update message, the CU configuration update message comprising a first list of one or more transport network layer (TNL) addresses of the CU, the first list comprising a first TNL address of the CU for which a first TNL association between the CU and the DU is to be added and a second TNL address of the CU for which a second TNL association between the CU and the DU is to be removed, wherein the CU configuration update message is received after an F1 setup procedure and in response to a change in one or more computational resources of the CU;

initiate establishment of the first TNL association between the CU and the DU via the first TNL address in response to the detection of the reception of the CU configuration update message; and initiate removal of the second TNL association between the CU and the DU via the second TNL address in response to the detection of the reception of the CU configuration update message.

\* \* \* \* \*